United States Patent
Copperman et al.

(10) Patent No.: US 6,711,585 B1
(45) Date of Patent: Mar. 23, 2004

(54) SYSTEM AND METHOD FOR IMPLEMENTING A KNOWLEDGE MANAGEMENT SYSTEM

(75) Inventors: Max Copperman, Santa Cruz, CA (US); Mark Angel, Cupertino, CA (US); Jeffrey H. Rudy, San Jose, CA (US); Scott B. Huffman, Redwood City, CA (US); David B. Kay, Los Gatos, CA (US); Raya Fratkina, Hayward, CA (US)

(73) Assignee: Kanisa Inc., Cupertino, CA (US)

( * ) Notice: Subject to any disclaimer, the term of this patent is extended or adjusted under 35 U.S.C. 154(b) by 489 days.

(21) Appl. No.: 09/594,083

(22) Filed: Jun. 15, 2000

Related U.S. Application Data

(60) Provisional application No. 60/139,509, filed on Jun. 15, 1999.

(51) Int. Cl.[7] .............................................. G06F 17/30
(52) U.S. Cl. .................................................. 707/104.1
(58) Field of Search ............................ 707/102, 104.1; 715/514

(56) References Cited

U.S. PATENT DOCUMENTS 4,918,621 A * 4/1990 Nado et al. .................... 706/51
5,034,898 A   7/1991 Lu et al.

(List continued on next page.)

FOREIGN PATENT DOCUMENTS

WO    WO 97/38378    10/1997
WO    WO 99/18526    4/1999

OTHER PUBLICATIONS

Buckley, "A Hierarchical Clustering Strategy for Very Large Fuzzy Databases," 1995 IEEE, International Conference on Systems, Man and Cybernetics, Oct. 22, 1995, pp. 3573–3578.

(List continued on next page.)

*Primary Examiner*—Safet Metjahic
*Assistant Examiner*—Sana Al-hashemi
(74) *Attorney, Agent, or Firm*—Schwegman, Lundberg, Woessner & Kluth, P.A.

(57) ABSTRACT

A method and system organize and retrieve information using taxonomies, a document classifier, and an autocontextualizer. Documents (or other knowledge containers) in an organization and retrieval subsystem may be manually or automatically classified into taxonomies. Documents are transformed from clear text into a structured record. Automatically constructed indexes help identify when the structured record is an appropriate response to a query. An automatic term extractor creates a list of terms indicative of the documents' subject matter. A subject matter expert identifies the terms relevant to the taxonomies. A term analysis system assigns the relevant terns to one or more taxonomies, and a suitable algorithm is then used to determine the relatedness between each list of terms and its associated taxonomy. The system then clusters documents for each taxonomy in accordance with the weights ascribed to the terms in the taxonomy's list and a directed acyclic graph (DAG) structure is created.

34 Claims, 29 Drawing Sheets

U.S. PATENT DOCUMENTS

| | | | |
|---|---|---|---|
| 5,309,359 A | 5/1994 | Katz et al. | |
| 5,404,295 A | 4/1995 | Katz et al. | |
| 5,553,226 A | 9/1996 | Kiuchi et al. | 395/161 |
| 5,555,408 A | 9/1996 | Fujisawa et al. | 395/600 |
| 5,568,640 A | 10/1996 | Nishiyama et al. | |
| 5,594,837 A | 1/1997 | Noyes | 395/63 |
| 5,600,831 A | 2/1997 | Levy et al. | |
| 5,625,767 A | 4/1997 | Bartell et al. | |
| 5,628,009 A | 5/1997 | Kikuta et al. | 395/610 |
| 5,630,125 A | 5/1997 | Zellweger | 395/614 |
| 5,644,740 A | 7/1997 | Kiuchi | 395/357 |
| 5,655,116 A | 8/1997 | Kirk et al. | |
| 5,659,725 A | 8/1997 | Levy et al. | |
| 5,724,571 A * | 3/1998 | Woods | 707/5 |
| 5,768,578 A | 6/1998 | Kirk et al. | |
| 5,787,417 A | 7/1998 | Hargrove | 707/4 |
| 5,794,050 A | 8/1998 | Dahlgren et al. | |
| 5,809,499 A | 9/1998 | Wong et al. | |
| 5,819,258 A | 10/1998 | Vaithyanathan et al. | |
| 5,845,270 A | 12/1998 | Schatz et al. | |
| 5,878,423 A | 3/1999 | Anderson et al. | |
| 5,991,756 A | 11/1999 | Wu | 707/3 |
| 6,169,986 B1 | 1/2001 | Bowman et al. | 707/5 |
| 6,233,575 B1 * | 5/2001 | Agrawal et al. | 707/6 |
| 6,256,627 B1 | 7/2001 | Beattie et al. | 707/6 |
| 6,282,538 B1 | 8/2001 | Woods | 707/5 |
| 6,297,824 B1 | 10/2001 | Hearst et al. | 345/357 |
| 6,301,579 B1 | 10/2001 | Becker | 707/102 |
| 6,314,420 B1 | 11/2001 | Lang et al. | 707/3 |

OTHER PUBLICATIONS

Chakrabarti et al., "Scalable feature selection, classification and signature generation for organizing large text databases into hierarchical topic taxonomies," The VLDB Journal, 7:163–178 (1998).

Li et al., "PowerBarkmarks: A System for Personalizable Web Information Organization, Sharing, and Management," Proceedings of the ACM SIGMOD International Conference on Management of Data, Jun. 1, 1999, pp. 1–19.

Magennis et al., "The potential and actual effectiveness of interactive query expansion," Annual International ACM–SIGIR Conference on Research and Development in Information Retrieval, Jul. 1997, pp. 324–332.

Stodder, et al., Toward Universal Business Intelligence (1997).

Tkach, "Information Mining with the IBM Intelligent Miner Family" (1998).

Wong et al., "ACTION: Automatic Classification for Full–Text Documents," Association of Computing Machinery SIGIR Forum, Mar. 21, 1996, pp. 26–41.

HTTP page entitled, "About The Information Manifold".

ProAmerica redefines customer care with Visual Warehouse, IBM, Feb. 1998.

HTTP text entitled, "Web–Connect," Nov. 1998.

HTTP page entitled, "Survey–Connect," Nov. 1998.

HTTP text entitled, "Quality–Connect," Nov. 1998.

HTTP text entitled, "Support–Connect," Nov. 1998.

HTTP text entitled, "Sales–Connect," Nov. 1998.

HTTP text entitled, "FAQs Connect–Care by ProAmerica—Frequently Asked Questions," Nov. 1998.

HTTP text entitled, "Industry Solutions," Nov. 1998.

HTTP text entitled, "The Kana Customer Messaging System," Nov. 1998.

Kana Communications—Success Story: Netscape.

Kana Communications,—Success Story: eBay.

Pro–America Connect–Care—The First Customer Care Software.

SCM—Theory of Customer Care, ProAmerica (1996).

IBM's Data Mining Technology (1996).

HTTP text entitled, "IBM Intelligent Miner for Data," Nov. 1998.

IBM Intelligent Miner for Data, Version 2.1.

Using the Intelligent Miner in a Simple Scenario—IBM, Apr. 1998.

(Kanisa) Intelligized Business Processes, 1998.

\* cited by examiner

Representative Taxonomy showing Types of Vehicles

FIG. 7

Index Preparation—Step 1

For each node:
Make a "node document" which is the concatenation of all documents tagged to the node (here represented by ●).

Region Designation: Marking

Identify nodes within distance $D$ of a number $N$ of query taxonomy tags. A node so identified is a *marked* node. Illustratively, here $D$ is one and $N$ is two.

Region Designation: Smoothing

Optionally, identify nodes within distance 1 of a query taxonomy tag or marked node. A node so identified is a *smoothed* node.

Region Designation: Aggregation

Identify groups of query taxonomy tags, marked nodes, and smoothed nodes that, transitively, are within distance $D'$ from each other. Illustratively, here $D'$ is one.

Per-topic statistics

| Topic ID | Topic name | # docs | # times topic was returned | # times topic was returned correctly | Precision | Recall | F-measure |
|---|---|---|---|---|---|---|---|
| v05 | Securities | 52 | 50 | 49 | 0.98 | 0.94 | 0.96 |
| v11 | Health Care | 42 | 42 | 42 | 1.00 | 1.00 | 1.00 |
| v07 | Manufacturing | 37 | 38 | 37 | 0.97 | 1.00 | 0.99 |
| v12 | Public Sector | 35 | 35 | 35 | 1.00 | 1.00 | 1.00 |
| v01 | Financial Services Overview | 30 | 29 | 29 | 1.00 | 0.97 | 0.98 |
| v04 | Insurance | 30 | 30 | 30 | 1.00 | 1.00 | 1.00 |
| v10 | Utilities and Energy | 28 | 27 | 27 | 1.00 | 0.96 | 0.98 |
| v02 | Banking (Business-to-Business) | 27 | 27 | 27 | 1.00 | 1.00 | 1.00 |
| v03 | Banking (Business-to-Consumer) | 26 | 26 | 26 | 1.00 | 1.00 | 1.00 |
| v08 | Retail | 21 | 23 | 21 | 0.91 | 1.00 | 0.95 |
| v09 | Service Providers | 12 | 12 | 12 | 1.00 | 1.00 | 1.00 |

\*\*\* Summary
Taxonomy has 332 documents.
Documents on average have 1.02 tags
Recall = 0.99
Precision = 0.99
F-measure = 0.99

Test On Train Report 1

FIG. 22

Per-document statistics Variable style

| Document | human tags | topic spotter tags | # correct tags returned | Precision | Recall |
|---|---|---|---|---|---|
|  | v05 (Securities) | v07 (Manufacturing) | 0 | 0.00 | 0.00 |
|  | v01 (Financial Services Overview) | v05 (Securities) | 0 | 0.00 | 0.00 |
|  | v05 (Securities) | v08 (Retail) | 0 | 0.00 | 0.00 |
|  | v10 (Utilities and Energy) | v08 (Retail) | 0 | 0.00 | 0.00 |
|  | v05 (Securities) | v05 (Securities) | 1 | 1.00 | 1.00 |
|  | v11 (Health Care) | v11 (Health Care) | 1 | 1.00 | 1.00 |
|  | v03 (Banking (Business-to-Consumer)) | v03 (Banking (Business-to-Consumer)) | 1 | 1.00 | 1.00 |
|  | v01 (Financial Services | v01 (Financial Services | 1 | 1.00 | 1.00 |

Test On Train Report 2

FIG. 23

Test On Train Report 3

Topic: v05 (Securities)
Top terms used by topic spotter:

1. Charles Schwab Securities Industry
2. Tax Relief Act
3. Securities and Exchange Commission
4. Merrill Lynch
5. Charles Schwab Corp.

| Document | Classification | Human-assigned tags | Topic spotter tags | Topic spotter scores |
|---|---|---|---|---|
|  |  | v05 | v05 (Securities) | 0.25 |
|  |  | v05 | v05 (Securities) | 0.35 |
|  |  | v05 | v05 (Securities) | 0.34 |
|  |  | v05 | v05 (Securities) | 0.20 |
|  |  | v05 | v05 (Securities) | 0.27 |
|  |  | v05 | v05 (Securities) | 0.18 |

Test On Train Report 4

FIG. 25

| | | | | |
|---|---|---|---|---|
| | | v05 | v05 (Securities) | 0.18 |
| | should be tagged to v05 | v05 | v08 (Retail) | 0.13 |
| | should be tagged to v05 | v05 | v07 (Manufacturing) | 0.25 |
| | | v05 | v05 (Securities) | 0.28 |
| | should be tagged to v05 | v01 v03 v05 | v03 (Banking (Business-to-Consumer)) v01 (Financial Services Overview) | 0.25 0.23 |
| | | v05 | v05 (Securities) | 0.21 |
| | | v05 | v05 (Securities) | 0.21 |
| | | v05 | v05 (Securities) | 0.24 |
| | | v05 | v05 (Securities) | 0.30 |
| | | v05 | v05 (Securities) | 0.32 |
| | | v05 | v05 (Securities) | 0.19 |

Test On Train Report 5

FIG. 26

SYSTEM AND METHOD FOR IMPLEMENTING A KNOWLEDGE MANAGEMENT SYSTEM

RELATED APPLICATIONS

The following application is relied upon and are hereby incorporated by reference in this application:

U.S. Provisional Application No. 60/139,5094, Jun. 15, 1999, entitled "Knowledge Management Software System, ".

FIELD OF THE INVENTION

This invention relates to systems and methods that facilitate the orderly storage of information and more particularly to a system and method for generating and utilizing knowledge containers for the orderly storage and retrieval of information.

BACKGROUND

A key resource of most, if not all, enterprises is knowledge. For example, in a customer service environment, customers expect prompt and correct answers to their information requests. These information requests may relate to problems with products the customer has purchased, or to questions about products they may decide to purchase in the future. In most cases, the answer to the customer's question exists somewhere within the enterprise. In other cases, the answer may have existed in the enterprise at one time, but is no longer there. The challenge is to find the answer and provide it to the customer in a timely manner. Further complicating the situation is the fact that very few customer service representatives possess the skills necessary to assist customers on more than a limited number of topics. Unfortunately, providing customer service representatives with the knowledge necessary to adequately serve customers involves time-consuming and expensive training. Even with training, customer service representatives will inevitably encounter questions for which no reasonable amount of training can prepare them to answer without expert consultation. The delay endured by the customer as the customer service representative consults with an expert is inconvenient, and often intolerable.

One solution to this problem has been to replace the customer service representative with a Web site of product-unique or vendor-unique reference material. Whenever the customer has a question, he/she is referred to the Web site for the answer. Another possible approach is for the vendor to maintain an email address specifically for customer inquiries, and to instruct customers to send all information requests to the email address. In addition to reducing the cost of providing customer service support, these solutions also afford the customer service representative a convenient forum for preparing a personal and comprehensive response. Unfortunately, they are considerably less timely than either of the previous two approaches, sacrifice the quality of the customer's interaction and dehumanize the entire process.

Some enterprises employ Web search engines in an effort to provide reliable access to relevant information in the enterprise (e.g., on a company's computer network). Unfortunately, because these web search engines check for particular textual content without the advantage of context or domain knowledge, they generally do not reliably and consistently return the desired information. This is at least partly due to the fact that languages are not only inherently ambiguous, but also because they are susceptible to expressing a single concept any number of ways using numerous and unrelated words and/or phrases. By simply searching for specific words, prior art search engines fail to identify the other alternatives that may also be helpful.

What is desired is a system that can quickly deliver timely and highly relevant knowledge upon request.

SUMMARY OF THE INVENTION

The present invention satisfies the above-described need by providing a system and method for organizing and retrieving information through the use of taxonomies, a document classifier, and an autocontextualization system.

Documents stored in the organization and retrieval subsystem may be manually through an attribute matching process or automatically classified into a predetermined number of taxonomies through a process called autocontextualization. In operation, the documents are first transformed from clear text into a structured record (knowledge container) automatically constructed indexes (tags) to help identify when the structured record is an appropriate response to a particular query. An automatic term extractor creates a list of terms that are indicative of the subject matter contained in the documents, and then a subject matter expert identifies the terms that are relevant to the taxonomies. A term analysis system assigns the relevant terms to one or more taxonomies, and a suitable algorithm is then used to determine the relatedness (weight) between each list of terms and its associated taxonomy. The system then clusters documents for each taxonomy in accordance with the weights ascribed to the terms in the taxonomy's list and a directed acyclic graph (DAG) structure is created.

The present invention may then be used to aid a researcher or user in quickly identifying relevant documents, in response to an inputted query. It may be appreciated that both a document's content and information added during autocontextualization is available for retrieval in the present invention. Moreover, the present system can retrieve any type of knowledge container, including not only those derived from some kind of document (such as "document" or "question" knowledge containers) but also those that represent people and resources (such as knowledge consumer and product knowledge containers.) In a preferred embodiment, two retrieval techniques may be utilized: multiple-taxonomy browsing and query-based retrieval. In multiple-taxonomy browsing, the user specifies a taxonomic restriction to limit the knowledge containers that are eventually returned to the user. Taxonomic restrictions can be in the form of actual taxonomies (topic, filter, or lexical), Boolean relations or taxonomic relations (at, near, under, etc.) In a query-based retrieval, a user specifies a natural language query with one or more taxonomy tags, one or more taxonomic restrictions, and any knowledge container restrictions deemed necessary. In both cases, the method of retrieving documents through the use of taxonomies and knowledge containers seeks to identify matches between the query and the concept nodes in a taxonomy, to provide a faster and more relevant response than a content-based retrieval, which is driven by the actual words in the document.

Additional features and advantages of the invention will be set forth in the description which follows, and in part will be apparent from the description, or may be learned by practice of the invention. The objectives and other advantages of the invention will be realized and attained by the methods, systems, and apparatus particularly pointed out in the written description and claims hereof, as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings

FIG. 7 shows a document with its sections and paragraphs;

FIGS. 22–26 show various examples of a test on train report.

DETAILED DESCRIPTION

Figure 1:
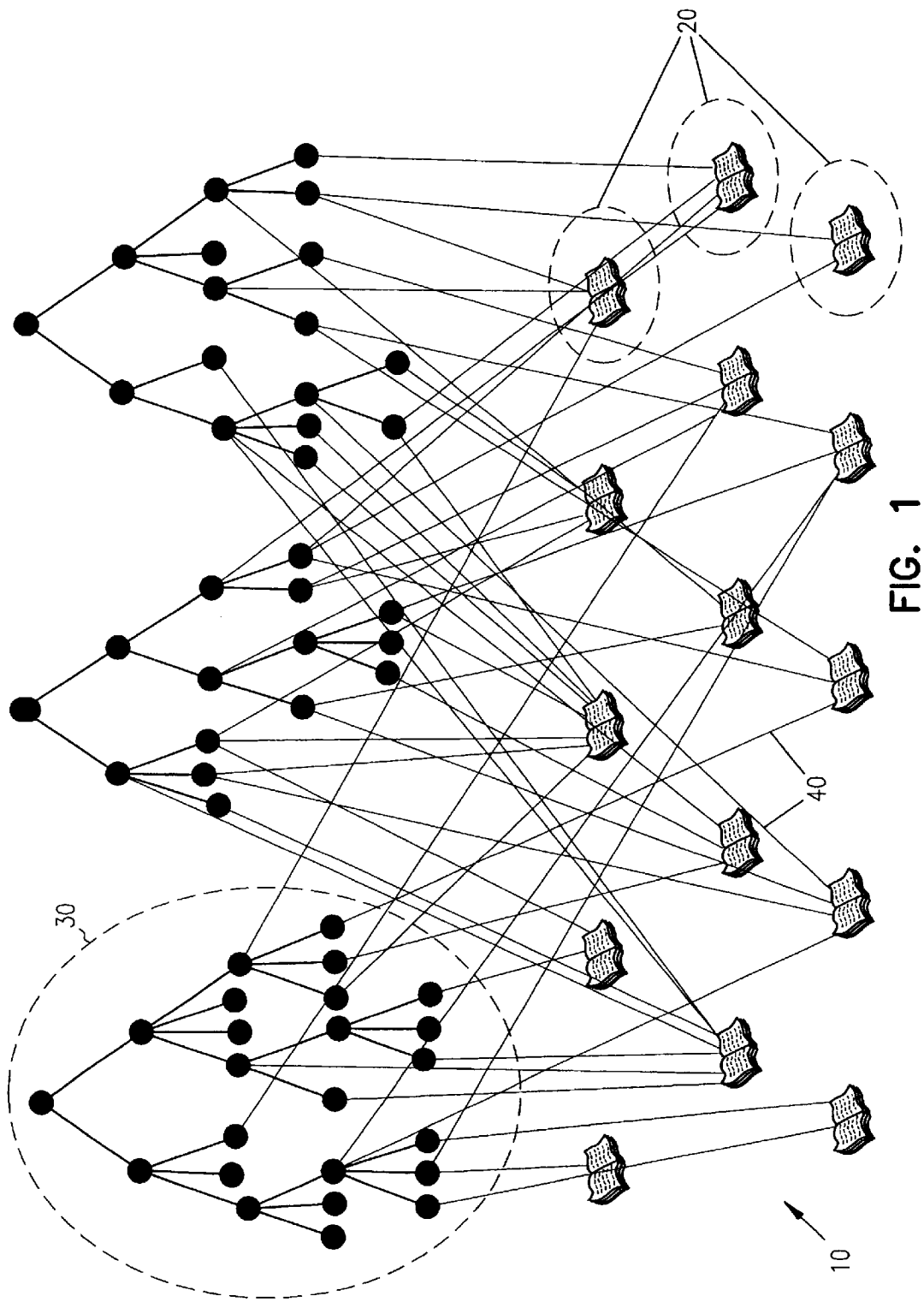
FIG. 1 is a drawing illustrating the relationship between knowledge containers, taxonomies and taxonomy tags.

In the following detailed description of the preferred embodiment, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of the present invention. The following detailed description is, therefore, not to be taken in a limited sense.

A system in accordance with the present invention is directed to a system (generically, an "e-service portal") and method for the delivery of information resources including electronic content (documents, online communities, software applications, etc.) and physical sources (experts within the company, other customers, etc.) to end-users.

Turning first to the nomenclature of the specification, the detailed description which follows is represented largely in terms of processes and symbolic representations of operations performed by conventional computer components, including a central processing unit (CPU), memory storage devices for the CPU, and connected pixel-oriented display devices. These operations include the manipulation of data bits by the CPU and the maintenance of these bits within data structures residing in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc., which are often associated with manual operations performed by a human operator. It must be understood that no such involvement of a human operator is necessary or even desirable in the present invention. The operations described herein are machine operations performed in conjunction with a human operator or user who interacts with the computer. The machines used for performing the operation of the present invention include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

The operating environment in which the present invention is used encompasses general distributed computing systems wherein general purpose computers, work stations, or personal computers are connected via communication links of various types. In a client server arrangement, programs and data, many in the form of objects, are made available by various members of the system.

Referring now to the figures, corresponding reference characters refer to corresponding elements, wherever possible. Like many systems of knowledge representation, the present invention represents and stores both the individual instances of information, and the concepts that can be used to organize these instances (i.e., single concepts that can be associated with multiple instances).

FIG. 1 depicts a knowledge map 10 for organizing various dimensions of information. As shown in FIG. 1, knowledge map 10 comprises knowledge containers 20, taxonomies 30 and taxonomy tags 40. Knowledge containers 20 are individual instances of information that may be associated with one or more taxonomies 30 through the use of one or more taxonomy tags 40.

Different types of knowledge containers 20 are used for different kinds of content and resources. Knowledge containers 20 can represent both rich electronic content (such as documents, answers to questions, marketing materials, etc.) and other physical and electronic resources (such as experts, customers, online communities of interest, software applications, etc.) The system uses a standard object-oriented inheritance model to implement the different types of knowledge containers 20. This provides a mechanism for creating new types of knowledge containers, which represent new types of content or resources, by creating and augmenting subtypes of the existing types. As further explained in Table 1, the types of knowledge containers include but are not limited to: document, question, answer, knowledge consumer, knowledge provider, e-resource and product knowledge containers.

TABLE 1

| Knowledge Container Type | Document |
|---|---|
| Represents | Some kind of electronic content, typically with a text component. |
| Usage | Represents documents, their content and their meta-data. |
| Knowledge Container Type | Question |
| Represents | A question asked by a system end-user |
| Usage | Used to hold a question, whether to be automatically answered or forwarded to an expert. Questions maintain links to their Answers. |
| Knowledge Container Type | Answer |
| Represents | An answer to a question |
| Usage | Used to hold an answer created by an expert. Answers maintain links to their Questions. |
| Knowledge Container Type | PAQ |
| Represents | A previously asked question (PAQ) |
| Usage | Used to hold a question and its answer pre-packaged for reuse. Can be automatically returned in answer to a Question. PAQs maintain links to a Question and an Answer. |
| Knowledge Container Type | Knowledge Consumer |
| Represents | A person who uses knowledge containers, by browsing the knowledge base, by asking questions, etc. |
| Usage | Used to represent a system end-user, generally a customer or partner of the enterprise, but also internal users (experts etc.). Knowledge Consumer knowledge container taxonomy tags represent the person's interest areas and levels of interest in those areas. |
| Knowledge Container Type | Knowledge Provider |
| Represents | A person who contributes knowledge to the system. |
| Usage | Used to represent subject experts in the organization who contribute knowledge containers, route or answer questions, review answers, and edit the collection of knowledge containers. Knowledge Provider knowledge container taxonomy tags represent the expert's areas of expertise and level of expertise in those areas. Since Knowledge Providers also use knowledge, they are linked to a Knowledge Consumer knowledge container. |
| Knowledge Container Type | E-Resource |
| Represents | Some kind of electronic resource |
| Usage | Holds a description of and a link to an electronic resource, such as an online community of interest, a transactional web page, an application, a search engine, or any other addressable resource (e.g. addressable by a Uniform Resource Locator (URL)). |
| Knowledge Container Type | Product |
| Represents | A specific product or product family sold by the enterprise employing the system |
| Usage | Holds a description of a product or product family. Tags and meta-data indicate features of the product. The content of the knowledge container may take the form of a "catalog" entry that describes the product in text, includes a picture or "banner ad" for the product, etc. |

Figure 2:
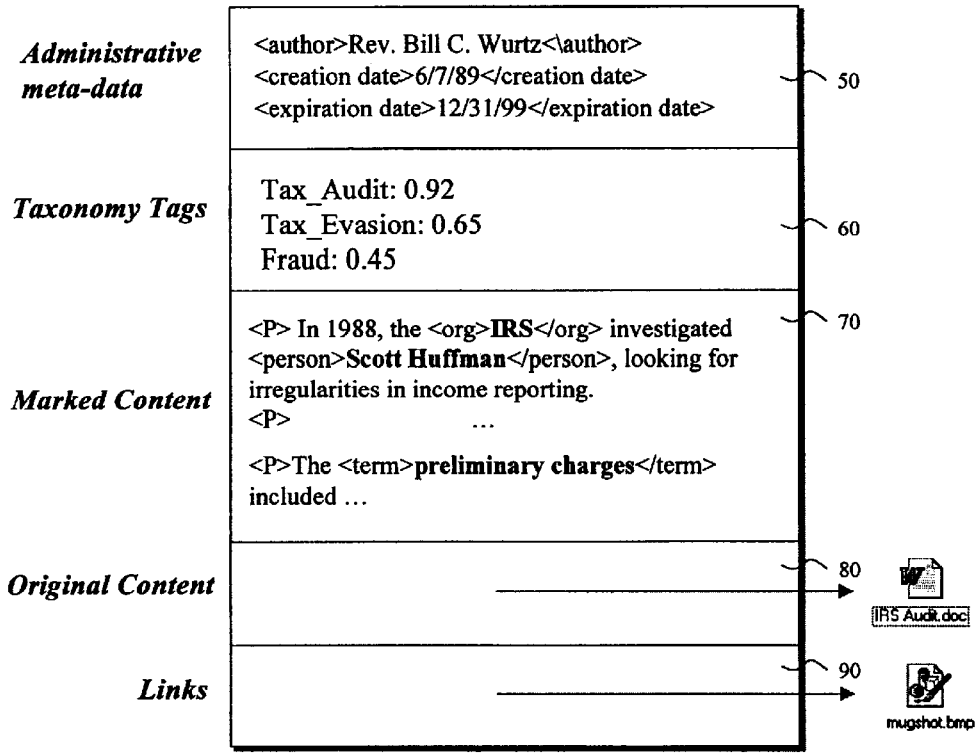
FIG. 2 shows one embodiment of knowledge containers that include five main components.

As shown in FIG. 2, each knowledge container comprises administrative meta-data 50, context tagging 60, marked content 70, original content 80 and links 90. Administrative meta-data 50 is a set of structured fields that hold typed information about the knowledge container, including who created it, who last modified it, for whom it was created, its title, a short "synopsis" or description, a Uniform Resource Locator (URL) for reaching the original version of the content (if applicable), the name of the publication the content appeared in (if applicable), etc. In some embodiments, the list of administrative metadata attributes is extensible, so each different enterprise that deploys the system may add richly typed fields that it desires and/or needs.

Context tags or taxonomy tags 60 represent a multidimensional classification of the knowledge container against a knowledge map, as depicted in FIG. 1. Such a classification puts the knowledge container 20 in context within a knowledge domain. Each taxonomy tag 60 includes the name or other unique identifier of a concept node (explained below) within a taxonomy 30 followed by a number, typically between 0 and 1, which indicates the knowledge container's strength of association with that concept node. The taxonomy tag 60 also includes an attribution (not shown) which records whether the tag was created by a person, an external process, or automatically by the system using autocontextualization (described below). There is no restriction on the number of taxonomies to which a knowledge container may be tagged, or the number of concept nodes within a taxonomy to which the knowledge container is tagged.

Marked content 70 is a textual representation of the contents of the knowledge container or a description or representation of the resource (for those knowledge containers that hold knowledge about resources). Marked content 70, as shown in FIG. 2, is written in a markup language, using any of the well-known markup languages (e.g., HTML, XML—eXtensible Markup Language, etc.) Marked content 70 can indicate the location of important features within the text, such as significant phrases, dates, geographical locations, people's names, and technical terminology. In some embodiments marked content can also indicate structural features of the text such as paragraphs, sentences, headers, tables, lists, etc. As in the case of taxonomy tags, each element of marked content 70 can contain attribution information that marks whether the element was created manually by a user or automatically by autocontextualization. The text content of knowledge containers is marked to indicate certain specific kinds of features (words and phrases of specific types.) For example, names, places, organizations, and significant phrases in the domain are called out with markup. This markup allows the display to be customized in a number of ways, including: (1) showing all features of a particular type in a summary view. For example, showing all names or organizations; (2) providing a distinguishing marking (such as color) to different feature types in a full view. This can help the reader focus in on the sections of a knowledge container most relevant to him or her; and (3) creating a "collapsed view" summary of the knowledge container, displaying only important features of particular kinds. Additionally, different versions of content (in whole or in part) may be marked within a single knowledge container. For example, one version of the content might be in English and another in Japanese. Or, one version of the content might be appropriate for a novice reader, and another for an expert. By selecting an appropriate XML stylesheet based on the customer profile, the appropriate content elements can be displayed.

The knowledge container 20 additionally contains the original electronic form of the original content 80 (perhaps a Microsoft Word document, a PDF file, an HTML page, a pointer to such content in an external repository, or a combination of the above). This allows the knowledge container 20 to be displayed to the end user in its complete and original form if desired.

Knowledge containers also include typed links 90 to other related knowledge containers. These links 90 can indicate part/whole relationships (e.g., a 'question' knowledge container and an 'answer' knowledge container are each part of a previously asked question (PAQ) knowledge container), aggregations (such as a 'knowledge provider' knowledge container linking to a 'knowledge consumer' knowledge container which models the behavior of the same person as an information consumer), or other relationships. Links 90 have type and direction.

In general, knowledge containers are displayed in one of three ways, with many possible variations of each: (1) Summary View, in which some small part of the knowledge container (usually meta-data) is displayed to give the user a brief overview of the knowledge container. Summary Views are typically used when displaying a list of possible knowledge containers (for example, knowledge containers retrieved by a query) in order to guide the user's selection of a particular knowledge container; (2) Full View, in which most or all of the text (tagged content) is displayed, generally in conjunction with other knowledge container components. Full Views are generally used to let a user read the text content of a particular knowledge container; and (3) Original View, in which the original content is viewed, generally in an application dedicated to the type of data that the original content happens to be. Original View is used to allow a user to see the rich or multimedia content of a knowledge container, for example a slide presentation or a graphical web page.

In addition to displaying knowledge containers 20, the present system is also capable of displaying taxonomy tags 60 several different ways. For example, the present system allows a user to: (1) show all taxonomy tags as concept node names, optionally with the names of their associated taxonomies; (2) show taxonomy tags which match a customer's profile; and (3) show taxonomy tags which match query taxonomy tags. In the three cases above, the concept node names can be live links which take the user into a browsing interface, seeing the concept nodes above and below in the taxonomy, and seeing all knowledge containers at (and below) the taxonomy. Taxonomy tags may also be used to create a natural language description of a knowledge container, called a "smart summary". To construct a smart summary, the system concatenates phrases which describe the taxonomy with phrases which describe the concept nodes in that taxonomy that are tagged to the knowledge container in such a manner that a set of reasonable natural language sentences are formed.

Figure 3:
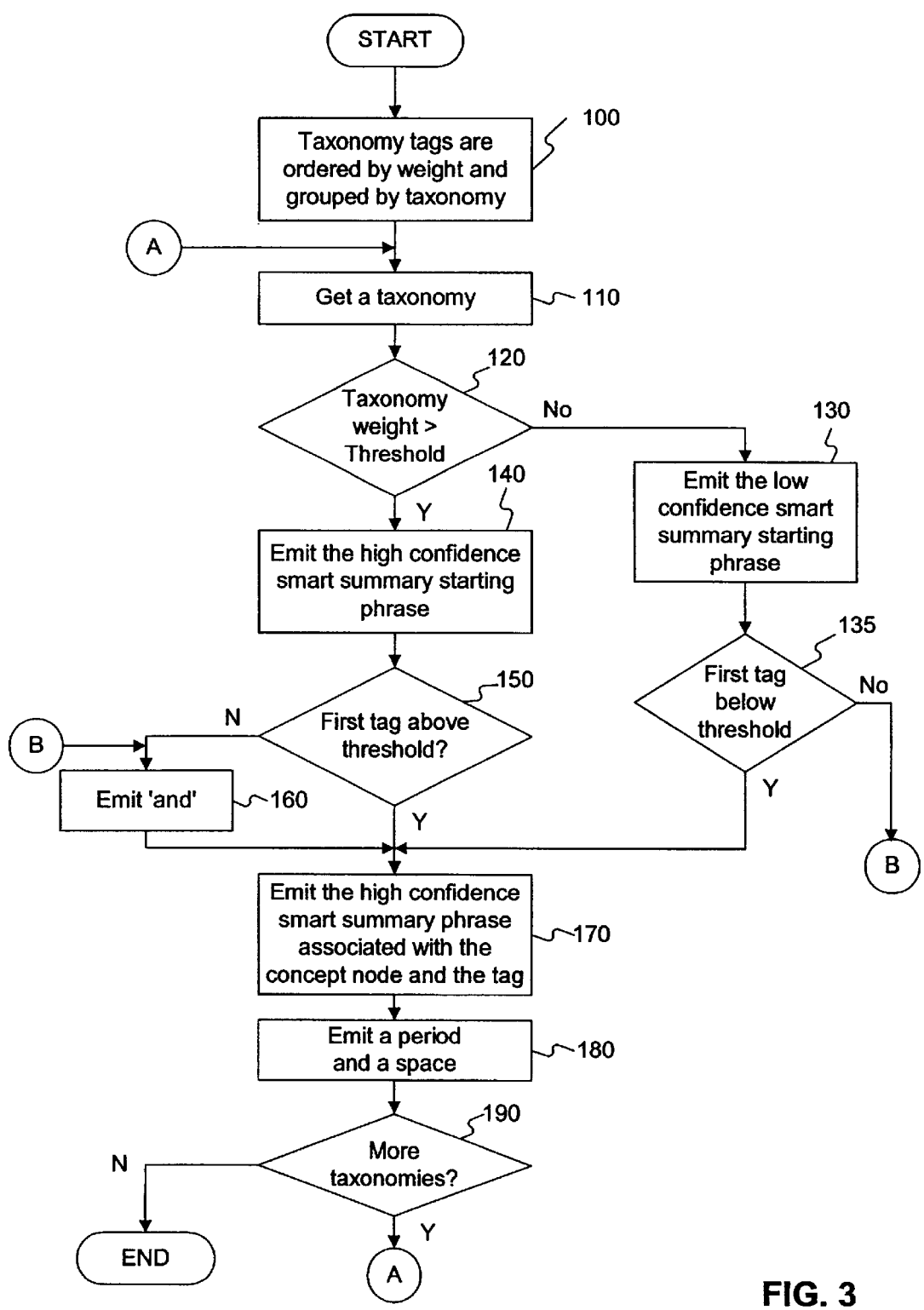
FIG. 3 shows a flowchart depicting the process of creating a smart summary.

As shown in FIG. 3, the process of creating a smart summary begins as follows: in step 100, taxonomy tags are grouped by taxonomy and then ordered by weight. The result is a list of taxonomies with associated taxonomy tags, ordered by the weight of the highest-weighted tag associated with that taxonomy. Next in step 110, the system extracts a taxonomy from the list. Processing then flows to step 120, where the taxonomy weight is tested to determine whether it exceeds a predetermined threshold. If it does, processing flows to step 140 and the system emits the high confidence smart summary starting phrase. Processing then flows to step 150 where the system determines whether the taxonomy tag is the first tag above the threshold. If it is, processing flows to step 170. If it is not the first tag above the threshold, the system emits an 'and' in step 160 and processing then flows to step 170. In step 120, if the system determines that the taxonomy weight is below the predetermined threshold, processing flows to step 130, where the system emits the low confidence smart summary processing phrase. Processing then flows to step 135, where the system determines whether the taxonomy tag is the first tag below the threshold. If it is, processing flows to step 170. If it is not the first tag below the threshold, processing flows to step 160 where the system emits an 'and'. Processing then flows to step 170 where the system emits the smart summary phrase associated with the concept node and the tag. Next, in step 180, the system emits a period and a space, and then processing flows to step 190. In step 190, the system determines whether there are any more taxonomies in the list. If there are, processing flows back to step 110 and another taxonomy is retrieved from the list. If there are not any more taxonomies, processing terminates.

In the preferred embodiment of the present invention, the system is also capable of using customer profile information described above to push content to interested users. More specifically, when a new batch of knowledge containers 20 enters the system, the system matches selected elements within each knowledge container against each customer's profile (taxonomy tags 40 in the associated customer knowledge container). Knowledge containers 20 which match customer profiles sufficiently closely—with a score over a predetermined threshold—are pushed to customers on their personal web pages, through email, or via email to other channels.

Figure 4:
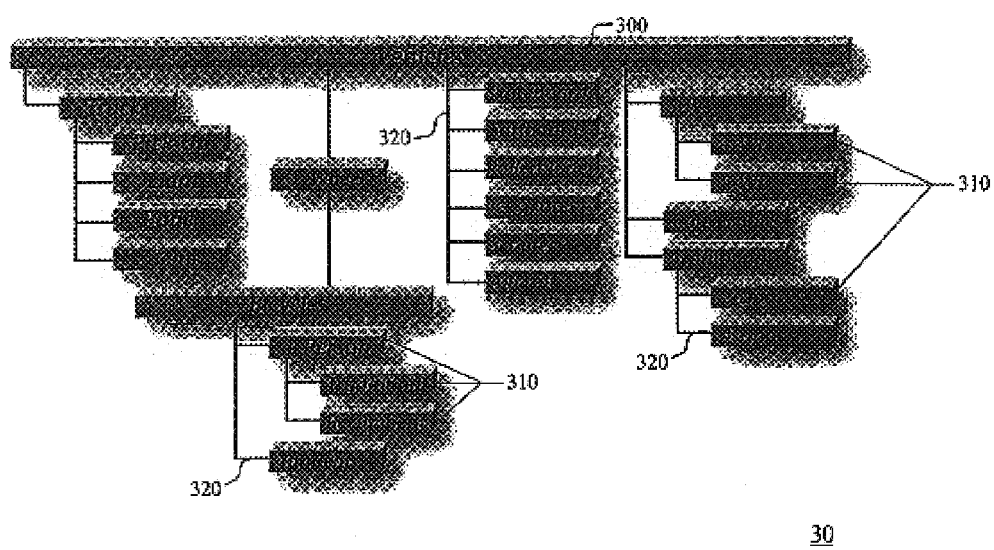
FIG. 4 shows an example of a taxonomy.

As stated earlier, knowledge containers are merely instances of information resources. Organizing these instances into comprehensive representations of information is accomplished through the use of taxonomies 30. An example of a taxonomy that details types of vehicles is shown in FIG. 4. As shown, taxonomy 30 consists of a root node 300, a plurality of concept nodes 310 coupled together by a plurality of edges 320. Each node (300 and 310) in a taxonomy expresses a concept, or a classification to which content and resources can be assigned. Each concept node (300 and 310) may have zero or more children. The set of concept nodes for each taxonomy is created to model the taxonomy's area of concern at an appropriate level for distinguishing among knowledge containers: neither too coarse a representation which fails to differentiate among many knowledge containers, nor too granular a representation which models more distinctions than practically exist among available knowledge containers. A concept node may also contain references or taxonomy tags to the knowledge containers that are classified to it. These references may be accessible either from the knowledge containers they classify (in which case it can be used to identify the concept node the knowledge container is classified to) or from the concept node to which the knowledge container is classified (in which case it can be used to identify the knowledge container).

Three main types of taxonomies are topic taxonomies, filter taxonomies and lexical or mentioned taxonomies. In a topic taxonomy, concept nodes represent topics. For knowledge containers representing documents or questions, tags to topic taxonomies indicate that the content of the document or question is about the topic to a degree indicated by the tag's weight. This mapping can be made manually through an attribute mapping process, or can be made via the automated autocontextualization process described below. For knowledge containers representing experts (Knowledge Provider knowledge containers), topic-taxonomy tags represent the areas where the expert has expertise. For knowledge containers representing people's interests (Knowledge Consumer knowledge containers), topic-taxonomy tags represent the person's interest level in a particular topic.

Filter taxonomies represent meta-data about documents, questions, knowledge-providers or knowledge-consumers that typically is not derivable solely from the textual content of the knowledge container. This can be any meta-data that can be represented by a taxonomy (e.g., a taxonomy of a geographic region a document or question originates from; a taxonomy of customer types or customer segments; a taxonomy of the organization from which experts are drawn; or a taxonomy of product types and products offered). Knowledge containers are tagged to taxonomy nodes by associating a topic tag with a document, set of documents, or questions at the point where they are submitted to the system. For example, a set of documents uploaded from a particular location could all be tagged as having the source taxonomy tag "Wall Street Journal" or a set of consumer-knowledge container's corresponding to customers could all be uploaded from an external database of customer information, with a mapping from a field in the customer information database to particular tags in a "customer segments" taxonomy. Such associations may be made manually or automatically. Filter taxonomies are extremely powerful when used in conjunction with other taxonomy types for retrieving knowledge. They are typically used to restrict retrieval of documents or experts that appear at, under, or near particular concept-nodes within the taxonomies. For example, users could be looking for documents that are from the NYTimes, pertain to any area of the United States, and are publicly readable.

Lexical taxonomies differ from the other taxonomies in the way that tags between concept-nodes and knowledge containers are determined. In lexical taxonomies, a knowledge container is tagged to a concept-node based on a simple lexical rule that matches against the content of the knowledge container. The content of the knowledge container here includes the text of the knowledge container, potentially marked content indicating entities (companies, locations, dates, peoples' names, etc.) and technical terminology (e.g. "object-oriented programming," or "business process re-engineering"). For example, a lexical taxonomy of companies might include a concept-node for "IBM" with the following associated lexical rule:

Tag the knowledge container to IBM if the knowledge container-content contains "<Company>IBM</Company>" or "<Company>International Business Machines</Company>".

Lexical taxonomies are useful for identifying and grouping concepts that occur using specific words and phrases within knowledge containers. For example, using a lexical taxonomy of companies organized hierarchically by industry type, in conjunction with a topic taxonomy of legal issues, a user could ask the system to:

"Show documents which (a) mention software companies and (b) talk about intellectual property protection." Here, (a) would be fulfilled by limiting the search to knowledge containers tagged to any concept-node under the "software companies" concept-node of a lexical "Companies" taxonomy (e.g., knowledge containers that mention IBM, Microsoft, etc.); and (b) would be fulfilled by looking at or near the topic of "intellectual property protection" in the legal issues topic taxonomy.

As shown in FIG. 4, taxonomy 30 may comprise a tree (a hierarchical directed acyclic graph) or a DAG (directed acyclic graph) structure. Briefly, a directed acyclic graph is a graph in which edges have a direction (an edge from node A to node B is different from an edge from node B to node A), and cycles are not permitted (a cycle is a sequence of edges from one node to another in which by following the edges from one node to the next, it is possible to return to a node previously visited). A node in a DAG may have multiple parents, but a node in a tree has at most one parent. In some embodiments only trees are allowed, meaning that all concept nodes have one and only one parent. In other embodiments DAG's are allowed, meaning that concept nodes can have multiple parents. Semantically, concept nodes in each taxonomy represent classifications in a single "dimension" or area of concern. For example, one taxonomy might represent a company's complete product line, and another might represent geography-different parts of the world. A general but not universal implication of one concept node being a child of another is that the parent represents a more general classification and the child a more specific sub-classification. Using vehicles as an example, a parent might be "SUJs" and a child of that could be "4-WD." Another general, but not necessarily universal implication is that two concept nodes that are close together in the taxonomy tree are closer semantically than two concept nodes that are farther apart. In other words, graph distance between concept nodes in the taxonomy approximates semantic difference in the knowledge domain. To better approximate semantic difference, taxonomic distance functions may be used. Taxonomic distance is the distance between concept nodes as defined by such a function. One such function weights the distance from a parent concept node to its child differently from the distance from the child to the parent. The motivation for this can be seen by an example: suppose the system has identified the "Trucks" node in the taxonomy above as being related to a user's query, perhaps because the word "truck" was in the query. Documents tagged to miles-per-gallon should I expect to get out of my pick-up if I have it loaded down with surfboards?"

Just as there are multiple types of knowledge containers and taxonomies, so too are there various meanings for the taxonomy tags that map between them. Table 2 below summarizes the meaning of tags between different types of knowledge containers and taxonomies.

TABLE 2

| Knowledge Container Type | Meaning of a tag to a Concept Node in a: | | |
|---|---|---|---|
| | Topic Taxonomy | Filter Taxonomy | Lexical Taxonomy |
| Question-KC | Question's content is about the topic represented by the concept-node; weight of the tag indicates the strength of the topic | Tags indicate meta-data about or entitlements of the question that corresponds to the concept-node | Content includes mentions of the tagged concept-nodes |
| Document KC | Document's content is about the topic represented by the concept-node; weight of the tag indicates the strength of the topic | Tags indicate meta-data about the that corresponds to the concept-node or entitlements required to retrieve or view it | Content includes mentions of the tagged concept-nodes |
| Consumer-KC (e.g. customer or other user of knowledge) | Consumer is interested in the topic represented by the concept-node; weight of the tag indicates strength of the interest | Tags indicate meta-data about the consumer that corresponds to the concept-node or entitlements held by the consumer | Consumer is interested in the topic represented by the concept-node; weight of the tag indicates strength of the interest |
| Provider-KC (expert) | Provider has expertise in the topic represented by the concept-node; weight of the tag indicates level of expertise | Tags indicate meta-data about the expert that corresponds to the concept-node or entitlements required to escalate to the user | Provider has expertise in the topic represented by the concept-node; weight of the tag indicates level of expertise Not applicable |

"Trucks" are likely to be relevant. Documents tagged to the child concept node "Pick-up" may or may not be relevant, but are at least about trucks, inasmuch as pickups are trucks. In contrast, documents tagged to the parent node "Vehicles" may be about skateboards or surfboards as well as about trucks. Another input to a distance function might be the level in the tree of the concept nodes. Close to the root, large distinctions are being made, while close to the leaves, fine distinctions are being made. Another consideration is that a representation of domain knowledge might not be as regular a structure as one would like. It may be useful to allow a domain expert to specify the distances between nodes, or to modify the distance that a function as described might ascribe between particular nodes, using knowledge about the semantic distance between concept nodes in the taxonomy. One mechanism that would provide this capability would be to represent the taxonomic distance function as a table of numeric or discrete values that can be edited by a person. It may also prove valuable to know the distance between nodes in distinct taxonomies, as described by some function of the knowledge map. For example, suppose there is, in addition to "Vehicles", an "Efficiency" taxonomy that contains a "Miles-per-gallon" concept node. The distance between the "Surfboard" concept node in "Vehicles" and the "Miles-per-gallon" concept node in "Efficiency" would be large. This distance could be used by the system to discount documents tagged to "Surfboard" in response to the query "How many Determining the context of the content of knowledge container 20 may be automatically accomplished through a process called autocontextualization. In a preferred embodiment, a "context" is a list of tags that together describe or classify multiple aspects of the content of a block of text, together with indications of the location of important features within the text. As stated earlier, taxonomy tags 40 and marked content 70 are added by autocontextualization. The purpose of autocontextualization is to provide a mechanism for transforming a document (e.g., a document created by a word processor, or an e-mail) into a structured record and to automatically (without human review) construct indexes usable by a content-based retrieval engine to help identify when the structured record is an appropriate response to a particular query. In one embodiment, autocontextualization is applied to document knowledge containers and question knowledge containers. In other embodiments similar techniques can be applied to consumer and provider knowledge containers. It is important to note that in some embodiments, some taxonomy tags are not dependent on the content of the knowledge container 20, but rather depend on the context in which particular content was created (e.g., by a certain author, or at a certain step in a business process). While these tags are important for defining context, they are an input to the autocontextualization process, not an output thereof.

Figure 5:
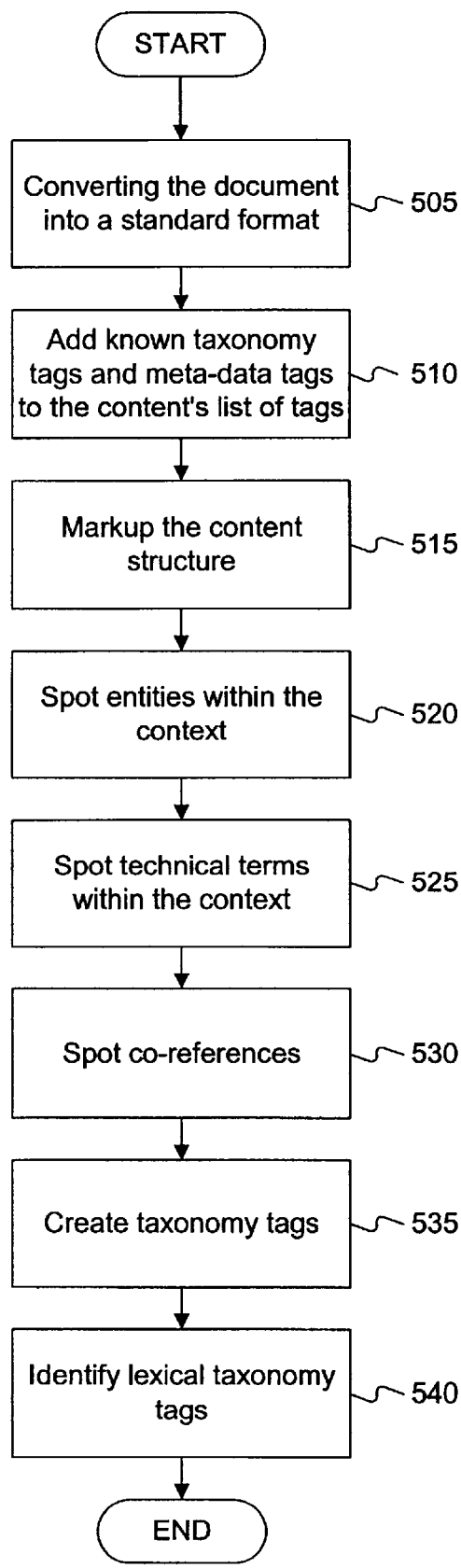
FIG. 5 shows a flowchart depicting the process of auto-contextualization.

The process of autocontextualization begins as shown in FIG. 5, by first converting a document in step 505 from any one of several original formats, including Microsoft Word, HTML, and PDF, into a standard, simple format from which the simple, unformatted text of the document is easily extracted.

Next, in step 510, the system adds known taxonomy tags and meta-data tags to the content's list of tags. As mentioned above, there are often taxonomy tags from either topic taxonomies or filter taxonomies, and other meta-data such as the submitter's name, that are known to apply when context is created. These tags are inputs to the autocontextualization process along with the content. In this step these tags are simply added to the content's list of tags. They can be added to the content as HTML, XML, as related database entries, or in a variety of other forms. As an example, a website providing customer service could contain different web pages that allow users to ask service questions about different product lines. For instance, one page could be labeled "Ask a question about your laser printer:" and another page could be entitled "Ask a question about your personal computer:". When a question arrives from the "laser printer" page to be autocontextualized and then answered, a tag for LASER-PRINTER from a "types of products" taxonomy may be added to the question. This tag is used similarly to automatically generate tags created from the content of the question. In this example, the tag serves to focus the retrieval process, described below, tending to select knowledge containers that pertain to laser printers. As another example, when a customer asks a question or an employee submits a document via a website or email, the system may know something about the customer or employee that can be added to the new question knowledge container or document knowledge container as tags. In addition to the customer's name or ID number, the system may know that the customer has purchased a large number of blue widgets recently; so a tag might be added to the customer's question that indicates BLUE-WIDGETS, to bias the retrieval process to prefer knowledge containers about that product. In some embodiments, this may be accomplished through integration with a customer database, a customer relationship management (CRM) system, or other external online repositories. The next step in the autocontextualization process is to markup the content structure (step 515). This step involves placing markup (e.g., XML, HTML) within the knowledge container content to designate key content structure features. In one embodiment, the XML tags may mark the following elements of the knowledge container content:

Title

Paragraphs

Headers

Tables

Pictures/Graphics

Captions

Content structure markup may be derived from the content itself, e.g. by recognizing whitespace patterns; or by preserving original structure elements from the original form of the document that has been converted. Content structure markup is embedded within the knowledge container using standard XML-based markers.

The fourth step of the process (step 520) is concerned with spotting entities within the context. "Entities" are names of people, place names, organization names, locations, dates, times, dollar amounts, numeric amounts, product names and company names, that appear in the text of the content being autocontextualized. Entities are identified (or "spotted") within the content using a combination of linguistic pattern-matching and heuristic techniques known in the art. In one embodiment, they are marked within the content using XML-based markers.

Next, in step 525, the system spots technical terms within the context. A technical term is a technical word or phrase that helps to define meaningful concepts in a given knowledge domain. Technical terms are usually 1 to 4 word combinations, used to describe a specialized function. In many cases, technical terms are the "jargon" of an expertise. Some examples of technical terms in the network computing field are "distributed computing", "local area network" and "router". In isolation, or outside the context of the knowledge domain of network computing, these words and word combinations have many meanings. Within a particular knowledge domain, however, technical terms are generally well understood by experts in the field. Technical terms are identified within the content using a combination of linguistic pattern-matching techniques, heuristic techniques, and dictionary lookup techniques known in the art. In one embodiment, they are marked within the content using XML-based markers. Similarly to content structure markup, the invention in its broadest aspect is not limited to any particular technique for identification or markup of technical terms.

Next, in step 530, the system performs co-reference spotting. The phrase co-reference refers to the use of multiple forms to refer to the same entity. For example, a document may refer to President William Clinton, President Clinton, Bill Clinton, Mr. Clinton, Clinton, William Jefferson Clinton, the President, and Bill. Despite the different forms, each phrase is a reference to the same individual. Co-references may be names of people, organization names (e.g., IBM and International Business Machines), place names (for example, New York City and the Big Apple) and product names (for example, Coke and Coca-Cola). In one embodiment, an algorithm for spotting co-references within a document begins with the entity spotting from step 520. The following entity types are examined for co-references:

Person,

Company

Organization

Product

All of the phrases marked as a person are run through the co-reference patterns established for that type. For example, the co-reference patterns for a person include Mr. <LAST_NAME>,<LAST_NAME>,<FIRST_NAME><LAST_NAME>, Ms. <FIRST_NAME><LAST_NAME>, <TITLE> and so on. Co-references are identified (or "spotted") within the content using techniques known in the field of computational linguistics. In one embodiment, they are marked within the content using XML-based markers.

The next step in the process (step 535) creates the taxonomy tags appropriate to the content of a knowledge container for taxonomies of the "topic taxonomy" type described above. Based on the entities, technical terms, and other words contained in the content, a text classifier is employed to identify concept nodes from a topic taxonomy. Each knowledge-container/concept-node association comprises a taxonomy tag. In one embodiment, the text classifiers are statistical differential vector-based text classifiers which are commonly known by those skilled in the art. These vector-based text classifiers operate by receiving a set of training texts for each classification they are meant to identify. They transform each training text into a vector of words and multi-word phrases and their frequencies, including the multi-word phrases tagged previously as entities and technical terms. They then perform aggregate statistics over these training-text vectors for each classification, and identify the statistical similarities and differences between vectors formed for each classification, in order to form a final trained vector for each classification. These vectors contain a list of words and multi-word phrases that are indicators of each classification, with weights or strengths (e.g. real numbers between 0 and 1) for each word or multi-word phrase. When presented with new text, the text classifiers turn the new text into a vector of words and multi-word phrases, and then identify the classifications that best correspond to the new text, assigning a score to each classification based on the distance between the classification's word/phrase vector and the new text's vector. In one embodiment, classifications used by the text classifiers correspond one-to-one with concept-nodes within topic taxonomies. A separate text classifier is applied for each taxonomy. Various parameters can be set to control the process of taxonomy tag identification using the text classifiers. These include threshold scores for tagging either document-knowledge containers or question-knowledge containers, and maximum numbers of tags to assign from each topic taxonomy to either document-knowledge containers or question-knowledge containers. Taxonomy tag identification creates a set of tags indicating concept-nodes from one or more taxonomies and weights for each tag, for the content being autocontextualized. These are added to the knowledge container, and can be represented as XML tags within the knowledge container content, as related database entries, or in a variety of other forms.

Optionally, autocontextualization can also add markup such as XML-tagged markers around those words and phrases in the text that the text classifiers indicate serve as the strongest evidence for the various taxonomy tags that are identified. For example, a vector-based text classifier may have learned a vector for the concept-node "business process re-engineering" that includes the technical terms "BPR", "business process re-engineering", and "downsizing" with strong weights (and potentially many other terms). When autocontextualizing a new document, if the topic-taxonomy tag "BPR" is identified during co-reference spotting, the system may place markup around appearances of phrases such as "BPR" and "downsizing" that appear in the content of the new document. The markup indicates that the term was evidence for the topic-taxonomy tag "BPR". Evidence tags are useful because they indicate the terminology in the document that caused each topic tag to be produced. By viewing the knowledge container with evidence for various topic tags highlighted, a user can get a sense of where in the document information pertaining to the various topics is most prevalent. For example, most information about "BPR" in a multiple page document might appear on a single page or in a single paragraph, and highlighting evidence can indicate this page or paragraph. In a retrieval application where a user has asked a question about the topic "BPR" this highlighting can be used in a user-interface to direct the user to exactly the portion of the knowledge container that is most relevant to their question. The same idea can be applied with multiple topic tags, potentially drawn from multiple taxonomies. For example, if the user's question is about the topics "BPR" and "Petroleum Industry", the system can use evidence tags to direct the user to the portion(s) of knowledge containers that contain the most evidence for those two topics.

The next step in the process (step 540) involves identifying lexical taxonomy tags based on entities and technical terms spotted in the content and concept-nodes drawn from one or more lexical taxonomies as described above. This is a simple mapping; e.g. based on the presence of entity "XYZ Corp.", add markup that indicates a mapping to the concept-node "XYZ-CORP" in a lexical "Companies" taxonomy. One piece of content may contain entities and technical terms that are mapped to concept-nodes in one or many lexical taxonomies.

Optionally, a set of transformational inference rules can be applied to refine the taxonomy tags produced by the previous steps. These rules are conditional on taxonomy tags, entity and technical term tags, and potentially other aspects of the content, and can either adjust the weights (confidence measure) of taxonomy tags, remove taxonomy tags, or add new taxonomy tags to the content. The rules can form chains of inference using standard inference techniques such as forward or backward inference. These transformational inference rules exist at two levels: structural transformations (based on graph relations between concept nodes); and knowledge-based transformations (based on specific concept-nodes and marked content). Transformations take advantage of the ontological and taxonomic relationships between concept-nodes, entities, and technical terms, to improve the tagging. For example, a structural transformation may be: "If document is tagged to more than two children of a parent, add a tag to the parent." A knowledge-based transformation may be: "If content is tagged to A, B, and C, and event E involves A, B, and C, and event E corresponds to tag Etag, then add tag Etag to the content."

Context is created from the output of the previous steps. The combination of context and content is a knowledge container. It is important to note that while autocontextualization envisions a fully automatic process, humans may manually improve upon or correct the automatically-generated context of autocontextualization.

Figure 6:
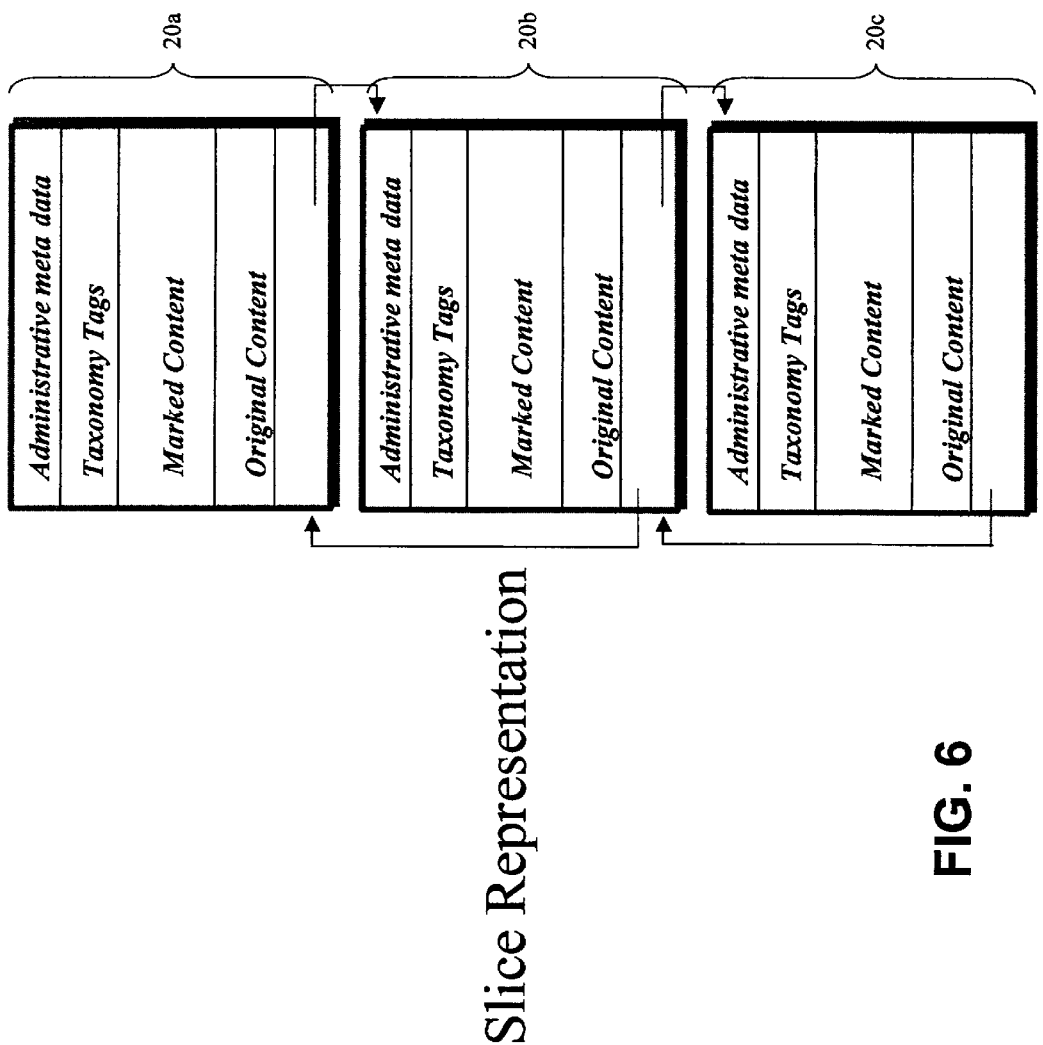
FIG. 6 shows an example of how the linked knowledge containers may be represented.

As an optional final step, content may be "sliced" by breaking the text into discrete sections. When a document, particularly a long document, contains sections about distinct topics, it is desirable to "slice" the document into multiple, contiguous sections. These multiple contiguous sections or "slices" may be stored as multiple knowledge containers, with individual taxonomy tags, or with knowledge container links to the previous and next slices. Referring now to FIG. 6, there is shown a plurality of knowledge containers 20 *a–c* with their associated links 90 *a–c*. As shown in FIG. 6, link 20*a* points to knowledge container 20*b*, link 90*b* points to knowledge containers 20*a* and 20*c*, and link 90*c* points to knowledge container 20*b*. This representation allows different sections of the document to be represented explicitly using taxonomy tags. In an alternate embodiment, the slices are demarcated within the textual content of a single knowledge container, using XML tags. The slicing algorithm may consider paragraph boundaries as possible "slice points," and then later decide which of the set of possible paragraph boundaries in the document are to be actual slice points that will form the boundaries between slices. The slicing algorithm may also consider sentence boundaries, section boundaries or page boundaries are considered as possible slice points. In general, a document should be sliced at points where there is a fairly substantial and permanent shift in a document's topic. These topic shift points are determined by applying the autocontextualization process to each paragraph of the document independently (where the paragraph boundaries are possible slice points). By identifying the set of taxonomy tags for each paragraph, the system can measure the topical "distance" between paragraphs. This distance can be calculated using a distance metric similar to that used in measuring the distance between a question and a potential result knowledge container in the retrieval process described below.

In addition to the topic distance between paragraphs, a slicing algorithm can take into account:

1. The amount of text since the previous slice point. As the amount grows, the system's propensity to slice increases. The algorithm is biased to assume that slicing ought to occur "every so often"—e.g. once every several paragraphs. The "slice duration" may vary according to the size of the document. For example, SliceSize = A + B * Sqrt [Total#ParagraphsInThisDoc]

may be calculated, where A and B are constants. Therefore the propensity to slice is proportional to [#ParagraphsInThisDoc]/[SliceSize]).

2. Formatting features designed to mark topic shifts, such as section headers. These can greatly increase the propensity to slice.
3. The length of the current paragraph. It generally doesn't make sense to create very short slices (e.g. one sentence).
4. The topical coherence of groups of paragraphs. Slicing preferably occurs only when there is a fairly substantial and permanent shift in a topic within a document. This means that slicing generally should not take place when a topic is predominant in one paragraph, disappears in the next, and then reappears in the following paragraph.

The slicing algorithm preferably makes cuts at places where the taxonomy tags indicate shifts at the paragraph level which are sustained for a "window" that has a larger size than a single paragraph. The topic distance between the current paragraph N and paragraphs N−2 and N−3, etc, up to some window size W; and similarly between paragraph N and N+1; and between N−1 and N+1, N+2, etc., up to W is examined, and if the distance is small, a bias against slicing at paragraph N is introduced. The goal of examining these surrounding paragraphs is to prevent superfluous slicing when the topic is fluctuating between related topics, or when insignificant, short references to other topics are embedded within a predominant topic.

If a document is split into multiple slices, a master knowledge container is maintained which references each slice and enables the entire document to be re-assembled. The output of the slicing step is multiple, linked knowledge containers each containing discrete sections of the text, in addition to the original knowledge container containing the entire original text.

Figure 7:
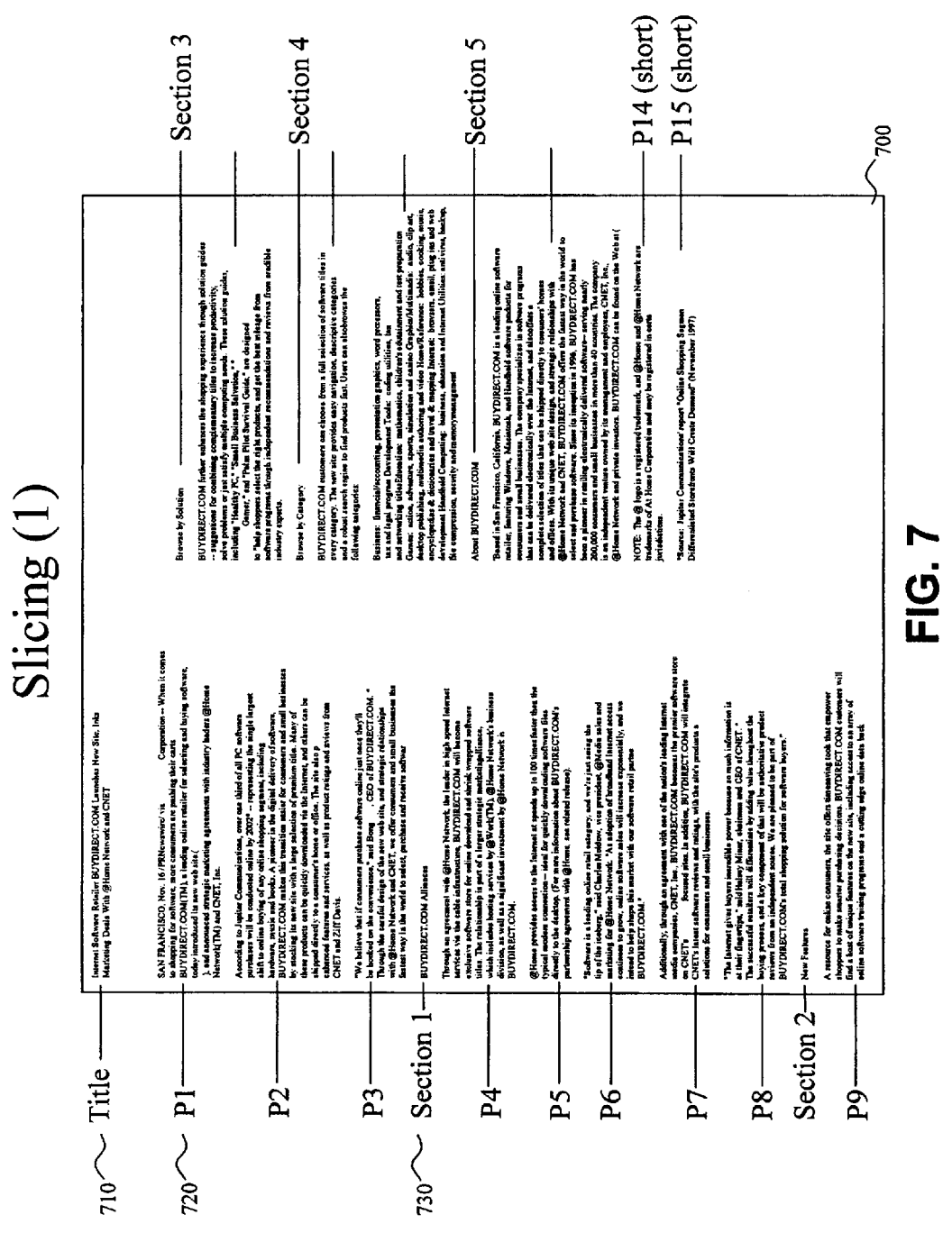
Figure 8:
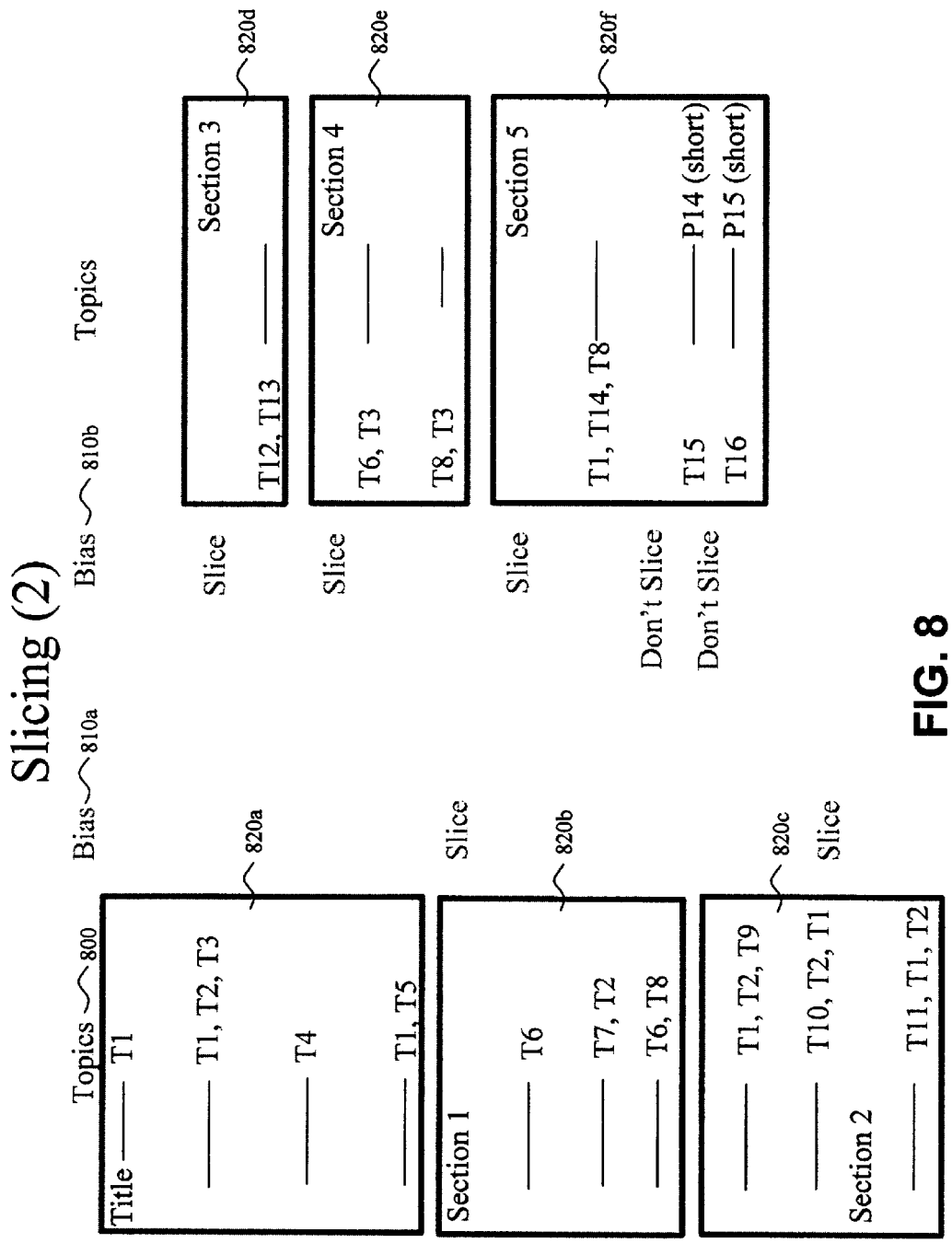
FIG. 8 shows how that document sliced according to one embodiment.
Figure 9A:
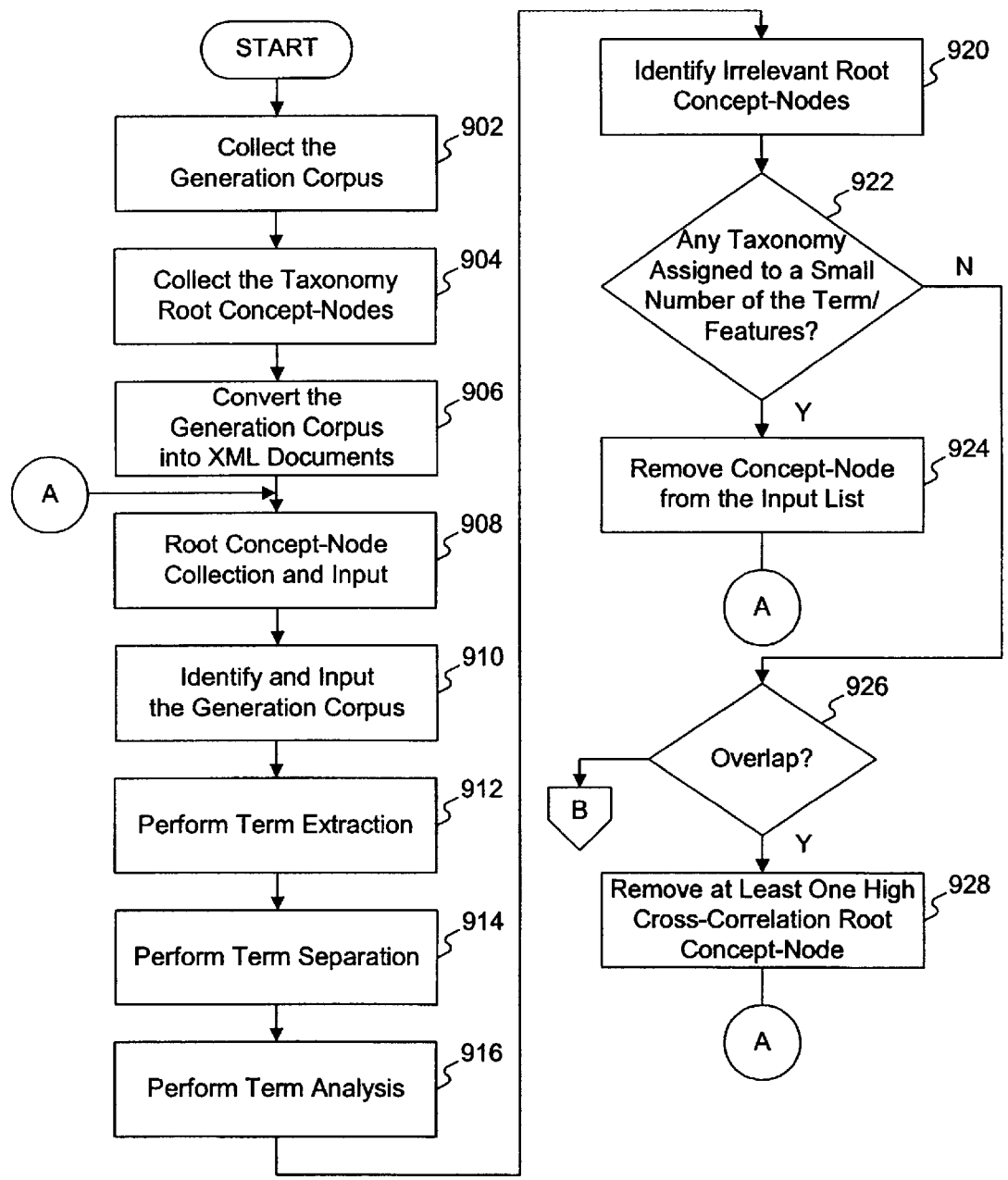
FIGS. 9a–9d show a flowchart depicting the process for generating a knowledge map.
Figure 9B:
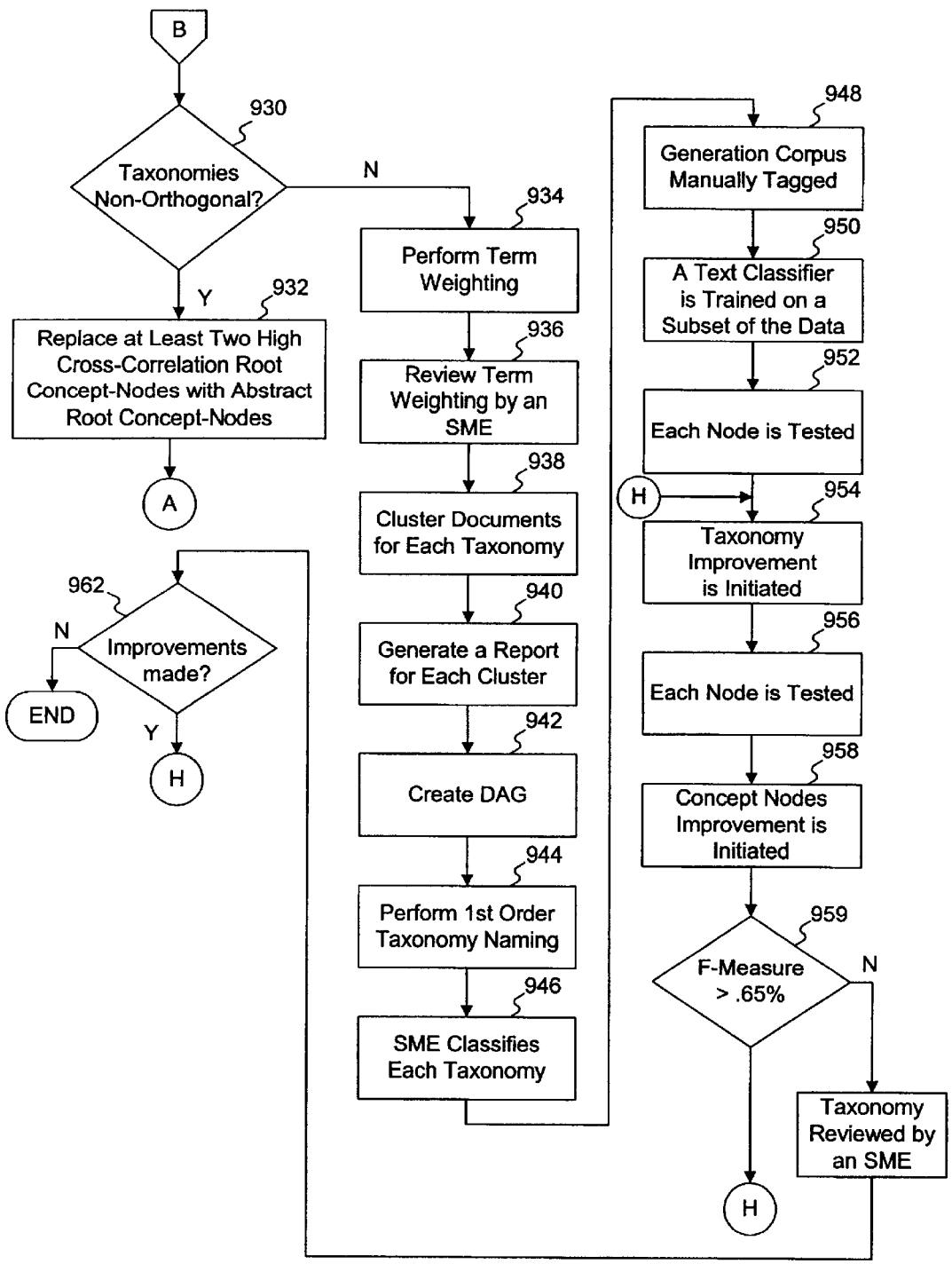
Figure 9C:
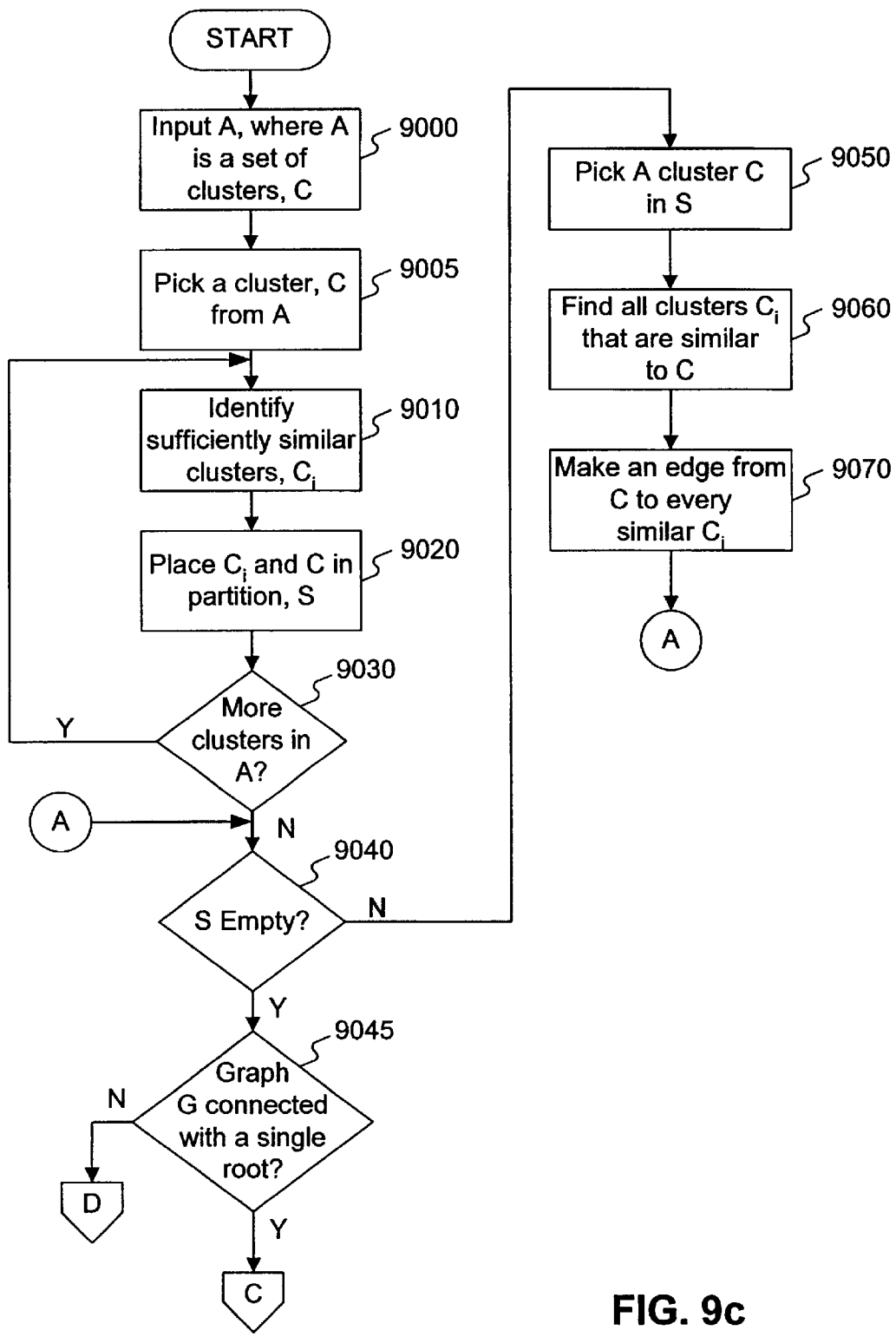
Figure 9D:
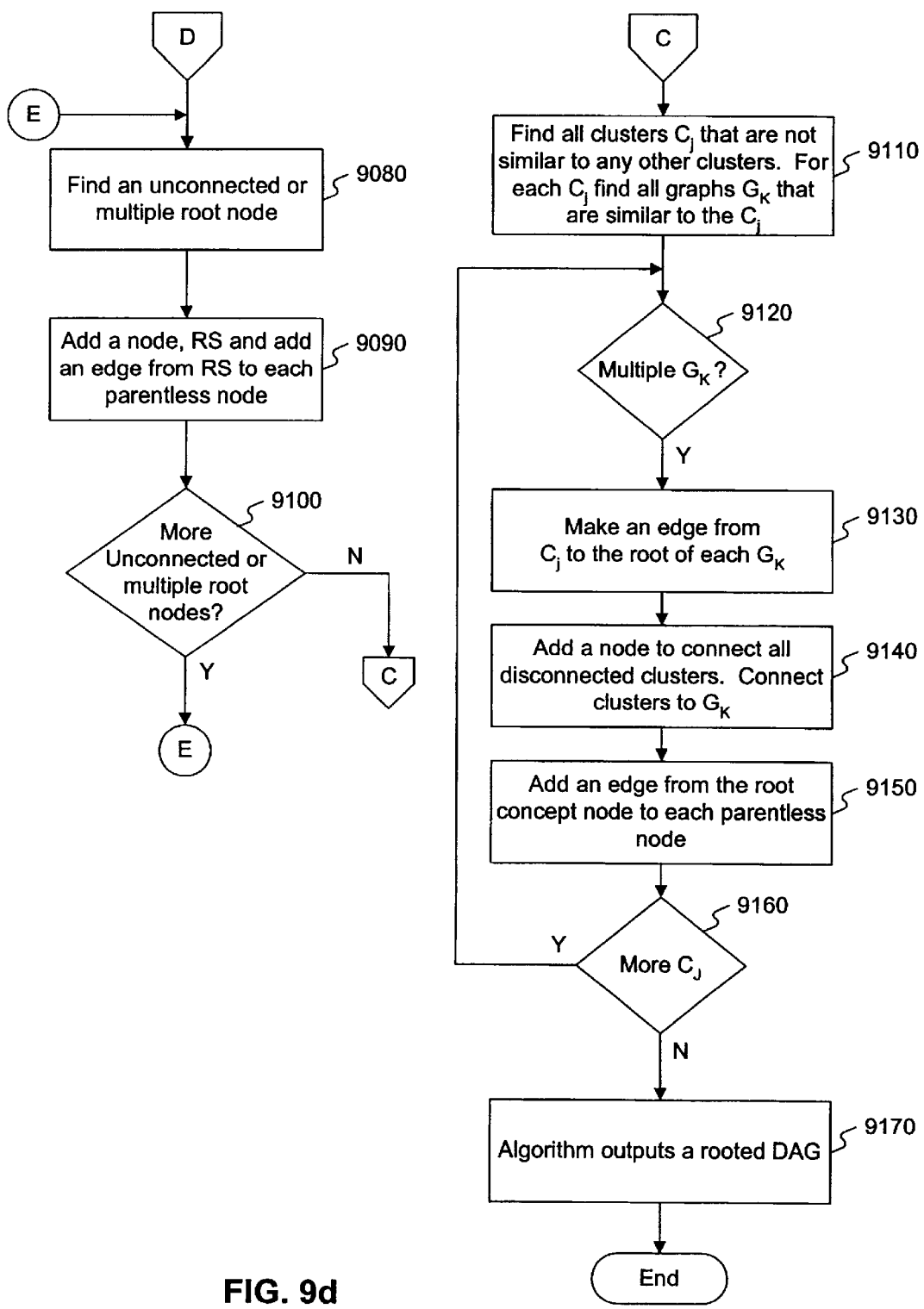

Referring now to FIG. 7, there is shown a typical document 700 with title 710, paragraph 720 and section 730 demarcations. FIG. 8 then shows the output of document 700 after the slicing algorithm has identified the various topics 800, biases 810, and slices 820. As shown in FIG. 8, the slicing algorithm has split the example document into 6 similarly-sized slices 820a–f. Each slice 820 contains 1–3 paragraphs 720, and 2–9 topics 800, with five out of six slices being made at section 730 or physical (beginning/end of the document) boundaries.

Now that the process of autocontextualization has been described, the following example is provided to fturther illustrate the concept. Assume the following paragraph of content is taken from a larger (fictitious) Microsoft Word document:

"IRS Reform Bill Passes
Dateline: May 5, 1998 Washington, D.C.
Today, the Senate passed legislation reforming the Internal Revenue Service, by a vote of 97-0.
Majority Leader Trent Lott said, "This historic bill is a radical reform -continued of the IRS and will change the way taxpayers are treated during the audit process for the better."

The following tags are known to the application through which the document is submitted, and are therefore also inputs to the autocontexutalization process Contributor is Joseph P. Blow, whose ID number inside the system is 27034, and who has the tag
Employer:External:Government:Congress_Agent Tags include:

Industry:Public-Sector:Federal Government
Document-Source:External:News:Reuters
note: the series of colons indicates a path from the root of a taxonomy to the concept-node First, the document is converted from Microsoft Word format to an XML text document.

<?XML version="1.0"?>
<context>
<context>
<content>
IRS Reform Bill Passes
Dateline: May 5, 1998 Washington, D.C.
Today, the Senate passed legislation reforming the Internal Revenue Service, by a vote of 97-0.
Majority Leader Trent Lott said, "This historic bill is a radical reform of the IRS and will change the way taxpayers are treated during the audit process for the better."
</content>

Next, in step 2, known tags and other meta-data are added. In this case, known information includes the submitter's ID, the date/time of submission, and the two taxonomy tags listed above. Adding these to the document (they could alternatively be added to a database entry for the document):

<?XML version="1.0"?>
<context>
    <submitter-id>27034</submitter-id>
<submission-time>
<day>05</day><month>April</month><year>1998</year><time>09:36:00</time>
    </submission-time>
    <taxonomy-tags>
        <tag taxo=Industry tagid=fg1 weight=1.0 attribution=human>Federal Government<tag>
        <tag taxo=Document-Source tagid=reut1 weight=1.0 attribution=human>Reuters</tag>
    </taxonomy-tags>
</context>
<content>
IRS Reform Bill Passes
Dateline: May 5, 1998 Washington, D.C.
Today, the Senate passed legislation reforming the Internal Revenue Service, by a vote of 97-0.

-continued

Majority Leader Trent Lott said, "This historic bill is a radical reform of the IRS and will change the way taxpayers are treated during the audit process for the better."
</content>

The next step in the autocontextualization process is to markup the content structure. Since the document structure here is minimal; the system recognizes a title and another header in the document, as well as paragraphs (the tag <p>) and sentences. The context is unchanged, and therefore is not reproduced below.

<content>
<title>IRS Reform Bill Passes</title>
<header>Dateline: May 5, 1998 Washington, D.C.</header>
<p><sentence>Today, the Senate passed legislation reforming the Internal Revenue Service, by a vote of 97-0.</sentence><sentence>Majonty Leader Trent Lott said, "This historic bill is a radical reform of the IRS and will change the way taxpayers are treated during the audit process for the better."</sentence></p>
</content>

The system next performs entity spotting. In this step, as discussed above, the system spots entities such as dates, people, and organizations.

<content>
<title><org>IRS</org>Reform Bill Passes</title>
<header>Dateline: <date>May 5, 1998</date><loc>Washington, D.C.</loc></header>
<p><sentence>Today, the <org>Senate</org>passed legislation reforming the<org>Internal Revenue Service</org>, by a vote of<number>97-0</number>.</sentence><sentence>Majority Leader<person>Trent Lott</person>said, "This historic bill is a radical reform of the<org>IRS</org>and will change the way taxpayers are treated during the audit process for the better."</sentence></p>
<content>

Next, autocontextualization spots technical terms within the content:

<content>
<title><org>IRS</org>Reform Bill Passes</title>
<header>Dateline: <date>May 5, 1998</date> <loc>Washington, D.C.</loc></header>
<p><sentence>Today, the <org>Senate<org>passed<term>legislation</term>reforming the<org>Internal Revenue Service</org>, by a vote of<number>97-0</number>.</sentence><sentence>Majority Leader <person>Trent Lott</person>said, "This historic bill is a radical reform of the<org>IRS</org>and will change the way taxpayers are treated during the<term>audit process</term>for the better."</sentence></p>
</content>

Next, co-references are spotted and linked together. As noted above, this is an optional step. In the XML snippet of content below we represent references by a "ref=N" attribute on the XML tags of entities. The only co-reference in this example is references to the IRS, which are all marked as "ref=1".

<content>
<title><org ref=1>IRS</org>Reform Bill Passes</title>
<header>Dateline: <date>May 5, 1998<date><loc ref=2>Washington, D.C.</loc></header>
<p><sentence>Today, the <org ref=3>Senate</org>passed<term>legislation</term>reforming the <org ref=1>Internal Revenue Service</org>, by a vote of <number>97-0</number>.</sentence><sentence>Majority Leader<person ref=4>Trent Lott</person>said, "This historic bill is a radical reform of the<org ref=1>IRS</org>and will change the way taxpayers are treated during the<term>audit process</term>for the better."</sentence><p>
</content>

In the next step, the text classifiers for each topic taxonomy are now run against the content. Based on the weighted vectors of terminology they have learned for various concept-nodes, they identify the major topics (up to N per taxonomy, where N can be different for each taxonomy) found in the content. By matching the vectors against the text they also identify the key words and phrases that are indicative of each identified topic. In the present example, assume that there is a detailed "Government Agencies" topic taxonomy, and a "Government Issues" topic taxonomy. Assume the autocontextualization parameters are set to identify up to two concept-nodes from "Government Agencies" and one "Legal Issues" concept-node. For our example content, typical concept nodes that might be identified by the text classifiers might be:

Government Agencies: Federal: Legislative: Congress with (estimated) weight=0.65

Government Agencies: Federal: Executive: IRS with (estimated) weight =0.75; and

Government Issue: Legislation: New Legislation with (estimated) weight =0.50.

Each of these three tags have associated terminology that evidences the presence of the topic. These are highlighted with XML tags as shown below:

<?XML version="1.0"?>
<context>
    </submitter-id>27034</submitter-id>
    <submission-time>
    <day>05</day><month>April</month><year>1998</year><time>09:36:00</time>
    </submission-time>
    <taxonomy-tags>
        <tag taxo=Industry tagid=fg1 weight=1.0 attribution=human>Federal Government</tag>
        <tag taxo=Document-Source tagid=reut1 weight=1.0 attribution=human>Reuters</tag>
        <tag taxo=Governrnent-Agencies tagid=con1 weight=0.65 attribution=machine>Congress</tag>
        <tag taxo=Government-Agencies tagid=irs1 weight=0.75 attribution=machine>IRS</tag>
        <tag taxo=Government-Issues tagid=nl1 weight=0.50 attribution=machine>New Legislation</tag>
    </taxonomy-tags>
</context>
<content>
<title><evid value=high tagid=irs1><org ref=1>IRS</org></evid>Reform <evid value=med tagid=nl1>Bill Passes</evid></title><header>Dateline: <date>May 5, 1998</date><evid value=low tagid=con1><loc ref=2>Washington, D.C. </loc></evid></header>
<p><sentence>Today, the <evid value=high tagid=con1><org ref=3>Senate</org></evid><evid value=med tagid=nl1>passed</evid><evid tagid=nl1 value=high><evid value=med tagid=con1><term>legislation</term></evid></evid>reforming the <evid value=high tagid=irs1><org ref=1>Internal Revenue Service</org></evid>, by a <evid tagid=nl1 value=low>vote</evid>of<number>97-0<number>.

-continued

```
</sentence><sentence><evid tagid=con1 value=high>Majority Leader
</evid><person ref=4>Trent<evid tagid=con1 value=low>Lott
</evid></person>said, "This historic <evid tagid=con1 value=low><evid
tagid=nl1 value=med>bill</evid></evid>is a radical reform of the <evid
value=high tagid=irs1><org ref=1>IRS</org></evid>and will change the
way <evid value=med tagid=irs1>taxpayers</evid>are treated during the
<evid value=med tagid=irs1 ><term>audit process</term></evid>
for the better."
</sentence></p>
</content>
```

In the next step, any entities or terms that correspond to concept-nodes in lexical taxonomies are marked and added to the tag list. Assume there is a lexical taxonomy of Government Officials, containing a node entitled:

Government Officials:Congresspersons:Trent Lott

This concept-node contains a lexical "rule" indicating that a Person entity of "Trent Lott" or its variations are indicators of the concept-node. After processing for lexical taxonomy tags, the result is as follows. Note the addition of a "tagid" to the <person> entity for Trent Lott.

"IRS". The topic taxonomy for Government Agencies indicates that the document concerns the tagged agencies; a lexical taxonomy would merely indicate that the document mentions the tagged agencies. It is obvious that both can be useful for retrieving documents.

The next step in the process involves using symbolic rules and reasoning in order to refine the set of tags applied to the document. For example, the output of this process may be the determination that another concept node that might be relevant to our example content is:

Government Issues:Legislation:Tax Legislation

A knowledge-based transformation that might infer the relevance of this concept node is:

If content is tagged to Government Agencies:Federal:Executive:IRS with weight above 0.60 and content is tagged to any node under Government Agencies:Government Issues:Legislation with weight X where X is greater than 0.35, add tag Government Issues:Legislation:Tax Legislation to the content with weight X.

Finally, the system stores the results as a knowledge container in its data store. If the document had been longer, the system could optionally invoke slicing to break the

```
<?XML version="1.0" ?>
<context>
    <submitter-id>27034</submitter-id>
<submission-time>
<day>05</day><month>April</month><year>1998</year><time>09:36:00<time>
    </submission-time>
    <taxonomy-tags>
        <tag taxo=Industry tagid=fg1 weight=1.0 attribution=human>Federal
Government</tag>
        <tag taxo=Document-Source tagid=reut1 weight=1.0
attribution=human>Reuters</tag>
        <tag taxo=Government-Agencies tagid=con1 weight=0.65
attribution=machine>Congress</tag>
        <tag taxo=Government-Agencies tagid=irs1 weight=0.75
attribution=machine>IRS</tag>
        <tag taxo=Government-Issues tagid=nl1 weight=0.50
attribution=machine>New Legislation</tag>
        <tag taxo=Government-Officials tagid=lott1 attribution=lexical>Trent
Lott</tag>
    </taxonomy-tags>
</context>
<content>
<title><evid value=high tagid=irs1><org ret=1>IRS</org></evid>Reform <evid
value=med tagid=nl1>Bill Passes</evid></title>
<header>Dateline: <date>May 5, 1998</date> <evid value=low tagid=con1><loc
ref=2>Washington, D.C.</loc><evid></header>
<p><sentence>Today, the <evid value=high tagid=con1><org
ref=3>Senate</org></evid><evid value=med tagid=nl1>passed</evid><evid tagid=nl1
value=high><evid value=med tagid=con1><term>legislation</term></evid></evid>
reforming the <evid value=high tagid=irs1><org ref=1>Internal Revenue
Service</org></evid>, by a <evid tagid=nl1 value=low>vote</evid>of <number>97-
0</number>.</sentence><sentence><evid tagid=con1 value=high>Majority
Leader</evid><person ref=4 tagid=lott1>Trent <evid tagid=con1
value=low>Lott</evid></person> said, "This historic <evid tagid=con1
value=low><evid tagid=nl1 value=med>bill</evid></evid> is a radical reform of the
<evid value=high tagid=irs1><org ref=1>IRS</org></evid> and will change the way
<evid value=med tagid=irs1>taxpayers</evid> are treated during the <evid value=med
tagid=irs1><term>audit process</term></evid>for the better."</sentence></p>
</content>
```

Notice that in this example, users of the system chose to set up, the "Government Agencies" taxonomy as a topic taxonomy rather than a lexical one. Therefore, tagging this document to, e.g., "IRS" was done using a text-classifier over the entire text to identify the evidence for IRS as indicated above (including words like "taxpayer"), rather than using the simpler mechanism of a lexical taxonomy that would map the phrase "IRS" directly to the concept-node document into multiple, contiguous sections with different topics assigned to each section. In this case, however, it was not necessary to perform any slicing.

The previous sections of this description focused on the fundamental elements of a knowledge map and the process of determining the context of the content of a knowledge container. The next portion of this description will address a process for creating a knowledge map from a collection of documents. As explained above, taxonomies, and by extension knowledge maps, may be manually constructed based on the intuition of knowledge engineers and subject matter experts. Unfortunately, the knowledge engineering necessary for the intuitive creation of taxonomies is time-consuming (and therefore expensive). The following-described process is a mechanism for computer-aided generation of a knowledge map usable within the overall e-Service Portal (ESP). Aided generation, using a process such as is described, dramatically reduces the time and cost of taxonomy creation, while producing a knowledge map able to perform well when utilized as the framework for service provision within the ESP. A value of this process is in reducing the cost of bringing an ESP online, while simultaneously improving the quality of operation.

The input into the knowledge map generation mechanism is a set of documents and a set of "target" taxonomy root nodes. The output is a knowledge map. A set of steps and algorithms that translate the former into the latter is described below. The starting point for knowledge map generation, as shown in FIG. 9, is the collection of documents that will be managed by the e-Service Portal (step 902). This collection will be referred to as the generation corpus. The generation corpus must either be the basis for the knowledge containers to be used within the Portal or is representative of the content to be placed in knowledge containers. In one embodiment, the generation corpus has the following characteristics: (1) the documents in the corpus are a statistically valid sample of the documents to be managed; (2) there are at least 1,000 and less than 30,000 documents; (3) there are at least the equivalent of 500 pages of text and no more than 50,000 pages of text; and (4) the documents are decomposable into ASCII text. The knowledge map generation process described below is language independent. That is, so long as the documents can be converted into electronic text, the process is also independent of document format and type.

The second input into the process (step 904) is a set of taxonomy root concept-nodes. One taxonomy is generated for each root node. A root concept-node is essentially the "name" of a taxonomy, and identifies the perspective on or facet of the knowledge domain covered by the taxonomy. Each root concept-node is the starting point for manufacturing a taxonomy, which is essentially an orthogonal view of the knowledge contained in the corpus. While the number of root concept-nodes is not limited, the set of root concept-nodes must meet three tests in order to be a valid input. First, the concept-nodes do not overlap. Second, the concept-nodes are relevant. Third, the concept-nodes are orthogonal. The purpose of each root concept-node is to be the seed for growing a full taxonomy. Therefore, the root nodes should not "overlap". Each root concept-node should generally be the basis for a discrete perspective on the underlying knowledge to be represented in the knowledge map. Overlap occurs when two root nodes are provided that are actually identical or nearly identical. In effect, the root concept-nodes are synonyms, and taxonomies generated from them would cover substantially the same portion and aspect of the knowledge domain. For example, the root nodes "Geography—The World" and "Nationality" may, for a given knowledge domain, turn out to be overlapping concepts. If all or most of the terms ascribed to two taxonomies overlap (i.e., they are ambiguous terms), then the taxonomies are non-discrete and are preferably combined into a single root node. If overlap is found, the input set of concept-nodes should be fixed and the knowledge map generation process re-initiated. Each root concept-node is a valid foundation for a view of knowledge actually contained in the corpus. Irrelevance occurs when a root concept node has no relationship to the content. For example, the concept-node "Geography—The World" would be irrelevant to a corpus that does not deal with "place" in any respect (combinatorial chemistry, for example). If few or no terms are ascribed to a particular root, then that root concept-node is probably not relevant. The cure is to eliminate the concept-node from the input set and to re-initiate the knowledge map generation mechanism. The goal is to have one taxonomy for each orthogonal view of knowledge within the corpus.

Each document may have one or more taxonomy tags into each taxonomy. In an orthogonal knowledge map, tags in one taxonomy should not, by definition, preclude tags in another taxonomy. Non-orthogonality occurs when two or more of the root concept-nodes provided are actually representative of a single view of knowledge and are more properly part of one taxonomy. A geographic view of corpus content might appropriately have the root concept of "The World". Non-orthogonality would exist when the content dealt with places around the world and two root concept-nodes were provided such as "Europe" and "North America". Essentially, non-orthogonality is the consequence of providing what more properly are leaf or interior nodes from a taxonomy as root nodes. The test for orthogonality is that within the knowledge domain there is no single concept for which two of the root nodes in the initial input are subsets. This test can be applied in the initial test on train step of knowledge map generation. If there is little or no cross-tagging between two taxonomies (documents tagged to one taxonomy are not tagged to another taxonomy), then non-orthogonality can be presumed. The remedy for non-orthogonality is to replace the root nodes with a single higher-level concept node and to re-initiate the knowledge map generation mechanism. Assuming valid inputs (documents and root concept-node set), the invention will produce a valid output.

As stated earlier, the described process generates a knowledge map. There is one taxonomy for each root concept-node in the input set. As shown in FIG. 9, the first step (904) is document collection. The generation corpus is a representative sample of documents from a single coherent knowledge domain, the representation of which meets the needs of a specific business problem or domain. In one typical scenario, an enterprise has a corpus of documents over which they would like to provide the retrieval and display capabilities described earlier in this specification. In that case, the generation corpus would be a subset of the enterprise's corpus of documents. The subset may be manually identified. In another scenario, the knowledge domain is well-defined, but the enterprise does not yet have a corpus covering the domain. In this case, representative documents must be found and accumulated to form the generation corpus If the available corpus is larger than the maximum size prescribed above, sampling procedures may be employed to choose a subset of documents for use in the generation corpus. As shown in step 906, the next step is to convert the documents into XML marked text as described above in the portion of the document that addressed auto-contextualization. Next, in step 908, the system performs root concept-node collection and input. A set of root concept nodes is provided, with the following information about each: taxonomy name (examples are "Geography", "Industry", and "Business Topic"); root node name (examples are "The World", "Private Sector" and "The Business World"); root identifier (any string unique within the set); and domain name (a unique string common to all root concept-nodes within the knowledge map). In a preferred embodiment, a file is prepared designating the set of root concept-nodes. This file is provided as an input to knowledge map generation and includes one record (with all associated information) for each root. Next, in step 910, the system identifies and inputs the generation corpus. In one embodiment, a file listing each individual document in the generation corpus and its physical location, one per line, is provided as an input to knowledge map generation. In step 912, term extraction is then performed. Using any valid algorithm for term feature extraction, a list of corpus terms is generated. The term list is ordered by frequency or weight. This term list includes all words and multiple word combinations deemed to have statistical significance as indicators of meaning within the generation corpus. The term list is a function of the generation corpus documents—the text of these documents is read and parsed to produce the list. A term may have any (or none) of the following characteristics in any combination: a term may be case-sensitive (the term "jaguar" is distinct from the term "Jaguar"; a term may be one or more words ("lion" or "Barbary lion" or "South Barbary lion"); a term may include punctuation ("INC." or "Yahoo!"); or a term may be a form of markup ("<NAME> John Smith</NAME>"). In step 914, the system then performs term separation. Terms are presented to a subject matter expert (SME) highly familiar with the knowledge domain associated with the generation corpus. The SME designates whether the term is relevant to each of the taxonomies in the input set. Each term may be relevant in zero to N taxonomies where N is the number of root concept-nodes. For example, the term "jaguar" may be relevant to the taxonomy on "Mammals" and the taxonomy on "Automobiles". The result of this step is N lists of terms where N is equal to the number of root concept-nodes. In one embodiment, the SME generates a set of terms a priori, from his or her knowledge of the domain, for each root concept node. The terms extracted in step 912 are automatically provisionally designated as relevant to zero or more taxonomies according to their similarity to the SME-generated term sets, using any word-similarity measures or algorithms from the fields of computational linguistics and information retrieval. These designations are presented to the SME for validation. Next, in step 916, the system performs term analysis. In that step, a report is generated with the following information: (1) the number (raw count) of terms assigned to each taxonomy; (2) the Pearson correlation between the terms assigned to each taxonomy with the terms assigned to every other taxonomy; and (3) a list of terms assigned to each taxonomy ordered by weight or frequency. Processing then flows to step 920, where the system performs diagnosis for irrelevant root concept nodes. In step 922, the system determines whether any taxonomy is assigned a small number or percentage of the term/features. If there are taxonomies that are assigned to a small number of terms/features, processing flows to step 924 and the concept node is removed from the input list. Processing then flows to step 908 and the process repeated. The system in step 926 then conducts a diagnosis for overlap and diagnosis for non-orthogonality. If the terms ascribed to any taxonomy correlate to a very high degree with the terms ascribed to any other taxonomy, then the taxonomies in question may overlap (step 926). In the case of overlap, one or more of the root concept-nodes with a high cross-correlation should be eliminated (step 928). Processing then flows to step 908 and the entire process repeated. Such high correlation of terms may alternatively indicate that the taxonomies in question are non-orthogonal (step 930). In this case, a set of two or more of the root concept-nodes with a high cross-correlation should be replaced with a more abstract root concept-nodes (step 932). Processing then flows to step 908 and the process repeated. If the system determines that there is not overlap or non-orthogonality, processing flows to step 934, where term weighting is performed. Using any standard algorithm for weighting a list of features in terms of relative importance, the term list for each taxonomy is weighted. Terms have a unique weight in relationship to each taxonomy to which they are ascribed. So, the term "jaguar" may have a low weight in relationship to the "Mammal" taxonomy and a high weight in relationship to the "Automobile" taxonomy and a zero weight (non-ascribed) in relationship to a "Geography" taxonomy. Optionally, the system may in step 936, subject the term weights generated in step 934 to review by an SME. The SME may then enter a new weight, replacing the computer-generated weight. One weighting algorithm has the following key characteristics:

1. Terms with a high weight in one taxonomy have suppressed weights in all other taxonomies. That is, independent of their weight in any other taxonomy, Jaguar and Lion may appear to have equal weight in the "Mammal" taxonomy. However, if "Jaguar" has a high weight in the "Automobile" taxonomy and the term "Lion" is not ascribed to any other taxonomy, "Lion" will have a higher weight in the "Mammal" term list than "Jaguar".
2. Term weights are ascribed such that "important" terms (terms whose appearance carries a lot of information) are given high weights. Results from the field of information retrieval or computational linguistics can be applied; it is known in the art of those fields how to ascribe high weights to important terms based on their frequency across the corpus document set, their distribution across the corpus document set, and the relative frequency of all terms.

Next, in step 938, the system clusters documents for each taxonomy. Documents are clustered separately for each and every taxonomy. To perform this operation, step 938 is repeated N times where N is the number of root concept-nodes. To execute the clustering, all terms that are non-ascribed to the taxonomy being generated are marked as stop words during the current clustering exercise. Stop words are essentially "removed" from the document. In order to illuminate the clustering process, an abbreviated example is given: Consider the following passage and the "target" taxonomy root nodes:

---

The jaguar is rapidly approaching extinction in South America. Its range has been reduced to small strips of jungle. As the rarest of the cat genus in the New World, the jaguar deserves special protection.

---

Term List for "Mammal" Taxonomy:
"jaguar", "New World", "jungle", "extinction", "cat genus"
Term List for "Geography" Taxonomy:
"South America", "New World".
Term List for "Environment" Taxonomy:
"jungle", "extinction", "rare/rarest", "range"
Clustering the document for each taxonomy provides:
Mammal Taxonomy:
"The jaguar is rapidly approaching extinction in <stop>. Its <stop>has been reduced to small strips of jungle. As the <stop> of the cat genus in the New World, the jaguar deserves special protection."

Geography Taxonomy:

"The <stop> is rapidly approaching <stop> in South America. Its <stop> has been reduced to small strips of <stop>. As the <stop>of the <stop> in the New World, the <stop> deserves special protection."

Environment Taxonomy:

"The <stop> is rapidly approaching extinction in <stop>. Its range has been reduced to small strips of jungle. As the rarest of the <stop> in the <stop>, the <stop> deserves special protection."

With all non-ascribed terms for the current taxonomy removed from the corpus, documents are clustered using any standard clustering algorithm such as nearest neighbor.

Next, in step 940, a report is generated for all clusters produced in Step 938. The total number of clusters is the sum of the clusters generated for each of the taxonomies. For each cluster, the report lists the most significant terms in order of importance. This term list is the basis for cluster naming in Step 944, below. Processing then flows to step 942 where the DAG is created. Using the DAG Creation Algorithm (discussed below) the set of clusters are ordered into a baseline taxonomy. The DAG Creation Algorithm relies on three principles: (1) similar clusters should be located closer to each other within a taxonomy; (2) clusters with commonality to many other clusters should be located "higher" in the taxonomy; and (3) more diffuse clusters should be higher in the taxonomy, more concentrated clusters lower.

As shown in FIG. 9C, the DAG Creation Algorithm (Greedy Algorithm) accepts as input a set of clusters in step 9000, and outputs a suggested taxonomy in step 9170. Let A be the set of all clusters. In step 9005, the algorithm picks a cluster C from A. The algorithm, in step 9010 then seeks to find all sufficiently similar clusters Ci, using a similarity threshold that is a parameter to the algorithm. Next, in step 9020, the system removes C and all Ci from A, and place them in partition S. Multiple partitions may exist, and because we are using a greedy algorithm, we arbitrarily select one. Alternatively, we could take the best partition, or a good partition. The process for transforming the greedy algorithm into an exhaustive algorithm that selects the best partition is commonly known by those skilled in the art. The process for transforming the exhaustive algorithm into an approximation algorithm that selects a good partition is also commonly known by those skilled in the art.

While S is not empty (step 9040), pick a cluster C in S (step 9050), find all clusters Ci that are similar to C (step 9060), where the same or a different similarity threshold may be used. If there are multiple Ci, make an edge (in step 9070) from C to each Ci (C becomes the parent of each Ci). Remove each Ci and each C from S. In this step, we choose clusters with commonality to multiple other clusters and elevate them to be parents of the others. But we have to avoid cycles in the graph, so we remove these parents and their children from further consideration. In that way, a child cannot become a parent of a parent, so cycles are avoided. But as with step 9000, this greedy approach means that the first potential parent/children group is selected, although there might be better candidates. Alternatively, all parent/child groupings may be generated, and the best ones selected. "Best" can be defined as preferring greater similarity and greater numbers of children. Another consequence of the original definition of step 9070 is that the depth of the taxonomy is limited, because children cannot become parents. This limitation can be eliminated by repeating the process over the parent clusters, that is, taking C to be an unattached cluster in the partition, and restricting the Ci to parent clusters. This process can be repeated until no more changes occur. If this is done, it is preferable to use a strict similarity measure in the first iteration and successively relax the similarity measure, so that nodes towards the bottom of the taxonomy are more similar to each other than nodes higher in the taxonomy. If S is empty (step 9040), processing flows to step 9045 where the system determines whether the graph G resulting from the previous processing is connected and has a single root. If the graph is connected with a single root, processing flows to step 9110. Otherwise, if G contains more than one node, processing flows to step 9080 where the system finds an unconnected or multiple root node. Next, processing flows to step 9090, and the system adds a node RS that will be a root for the set, and add an edge from RS to each parentless node in G, turning G into a rooted DAG (possibly a tree). If there are more unconnected or multiple root nodes, processing flows back to step 9080. Other wise processing flows to step 9110. In step 9110, the algorithm finds all clusters Cj that were not sufficiently similar to any other clusters (so they formed singleton sets and trivial graphs). For each Cj, find all non-trivial graphs Gk that are similar to Cj, where a graph is similar to a cluster if the union of terms in each cluster in the graph is similar to the terms in Cj, using a considerably lower similarity threshold. If there are multiple Gk (step 9120), make an edge from Cj to the root of each Gk (step 9130). In step 9140, add a node RCj that will be a root for all disconnected clusters, and add an edge from RCj to each Cj that was not similar to multiple Gk. Next, in step 9150, the algorithm adds an edge from the root concept node for this taxonomy to each parentless node. If there are more Cj (singleton or trivial graphs), as determined in step 9160, processing flows back to step 9120, otherwise processing terminates in step 9170. The result, a rooted DAG (possibly a tree), is the baseline taxonomy.

Next, in step 944 (FIG. 9b), the system performs $1^{st}$ Order Taxonomy Naming, Review and Improvement. In essence, the generated taxonomy is given to a SME to edit and improve using a taxonomy display and editing tool. The SME identifies a concept in the domain that is characterized or evoked by the terms in a cluster, provides a unique name to each such cluster/concept within the taxonomy, and preferably provides a description of the concept. The SME also eliminates clusters that do not characterize or evoke a significant concept in the knowledge domain. The SME additionally modifies the graph relations as necessary so that nodes representing concepts that are semantically close are close in the taxonomy, and so that generally (but not necessarily universally) the concept represented by a node is a specialization of the concept represented by its parent. In step 946, the SME then classifies each taxonomy as either a BE (environment), BP (process) or BT (topic) taxonomy. The subject matter expert classifies the taxonomy as either a manual or auto taxonomy—meaning that document assignments to the taxonomy (taxonomy tag assignment) will either be performed outside the system or will be performed by the system automatically using the auto-contextualization engine. The subject matter expert classifies the taxonomy as either a topic, filter or lexical taxonomy—meaning that the either a search engine will be invoked on indexes built from them or the taxonomy will be used as a filter on retrieval. Processing then flows to step 948, where the generation corpus is manually tagged by a subject matter expert against the taxonomy. This means that the subject matter expert indicates that the document is about one or more of the concepts designated from step 944, creating taxonomy tags for the document. Next in step 950, a text classifier is trained on a large subset (75–90%) of the data generated in step 948, as described above with respect to the autocontextualization process, where the classifications the classifier can identify are the concept nodes in the taxonomy. (The remainder is held out for test data). Once a text classifier has been generated for the taxonomy, the document set is automatically classified. A report, called a test on train report, is then generated which compares the accuracy of the automatically generated tags to the original manual tags. The test on train report provides the basis for the further refinement of the taxonomy. A sample of this test on train report is shown in FIGS. 22–26. In step 952, each node of the taxonomy is inspected to determine whether it is a "good" concept and whether it has been sufficiently trained. This diagnosis has five outcomes:

(1) the concept is satisfactory (default);

(2) the concept has insufficient documents. A minimum of 5 documents and 3 pages of text are required to adequately train a concept. Additional documents should be added if the f-measure is below 0.8 and the diagnostics above are not useful;

(3) the concept is confused with another concept. In other words, the taxonomy display tool and the TOT report indicate that documents that have been manually tagged to one concept are automatically tagged to another concept. If more than ⅓ of the documents assigned to one concept are erroneously tagged to another individual concept, confusion exists. The remedy is to combine the two concepts into a single concept or to refine the concept descriptions and retag in accordance with sharper distinctions until the confusion disappears;

(4) the concept is really more than one concept. F-measure is a measure from the field of Information Retrieval that combines two measures (precision and recall) from that field into a single number. If the f-measure for a concept is less than 0.5 and the erroneously tagged documents are spread over a number of other concepts, the solution is to consider decomposing the concept node; or (5) the concept is not appropriately part of the taxonomy. If the f-measure is less than 0.3 and an inspection of the assigned topics reveals that many are more appropriate tags than the original manual tags, the solution is to drop the concept-node from the taxonomy.

Next, in step 954, taxonomy improvement is initiated. One common fix for taxonomy improvement is additional document collection. Documents should be identified pertaining to the concepts which need more content. These additional documents should manually tagged and the text classifier recreated. Steps 950 through 954 are repeated until the vast majority (at least 85%) of all concept nodes have an f-measure greater than 80% and the taxonomy f-measure is greater than 85%, as indicated in the test on train report. Once the taxonomy has been refined using the test on train process, processing flows to step 954 where final tuning is performed using a "test on test" process. The documents in the generation corpus that were not used to train the text classifier are automatically classified (tagged) by the text classifier, without retraining the it. A report similar to the test on train report is then generated. This report shows how well the text classifier is doing against "fresh" content which was not used in building the model. In step 956, each node of the taxonomy is inspected to determine whether it is a "good" concept and whether it has been sufficiently trained. This diagnosis has five outcomes, identical to those identified with respect to step 952. Next, in step 958, concept nodes are improved by adding more documents or combined/removed to eliminate poorly performing sections of the taxonomy. Steps 954–958 are repeated using new test document sets until the f-measure exceeds 0.65% (in one embodiment) (step 959), as indicated in the test on test report. Finally, in step 960, the completed taxonomy is reviewed by a subject matter expert to validate the completed taxonomy or to make any changes. If changes are made (step 962), steps 954–960 are repeated.

Figure 10:
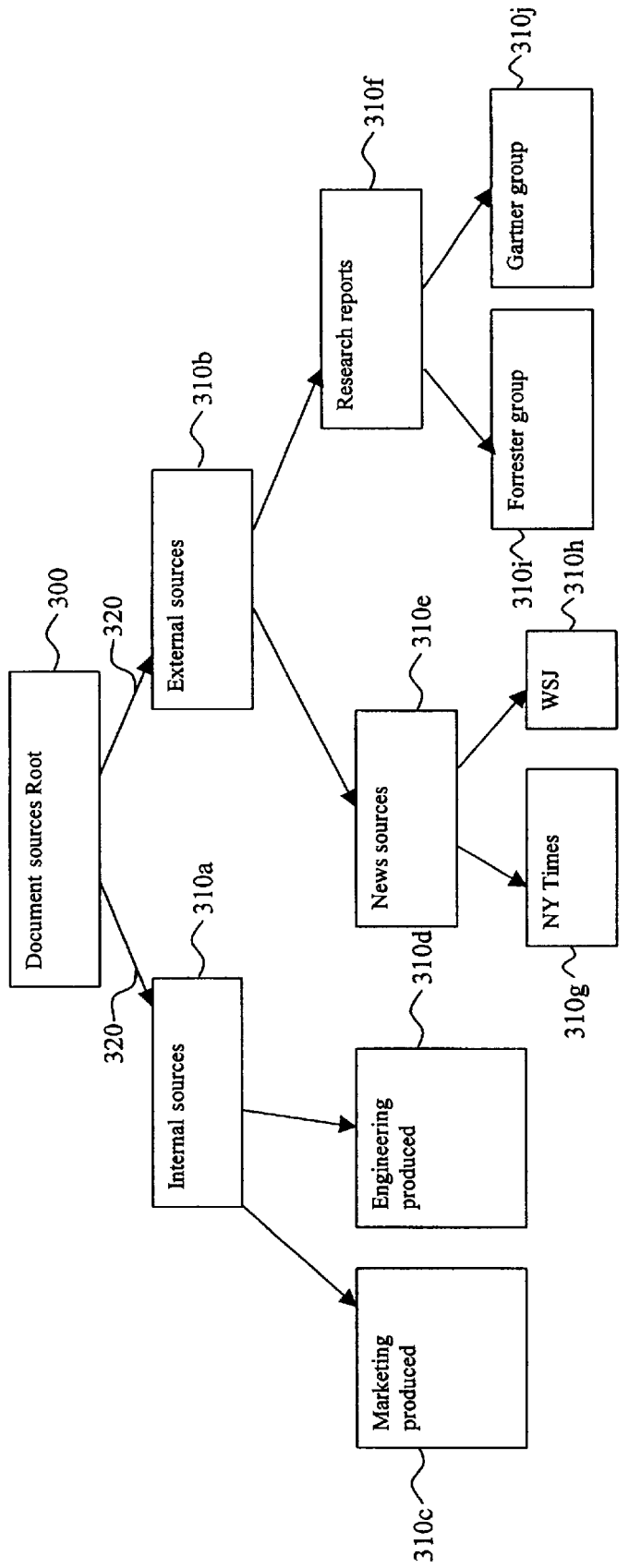
FIG. 10 shows a taxonomy of document sources, indicating from what source documents originally came.
Figure 11:
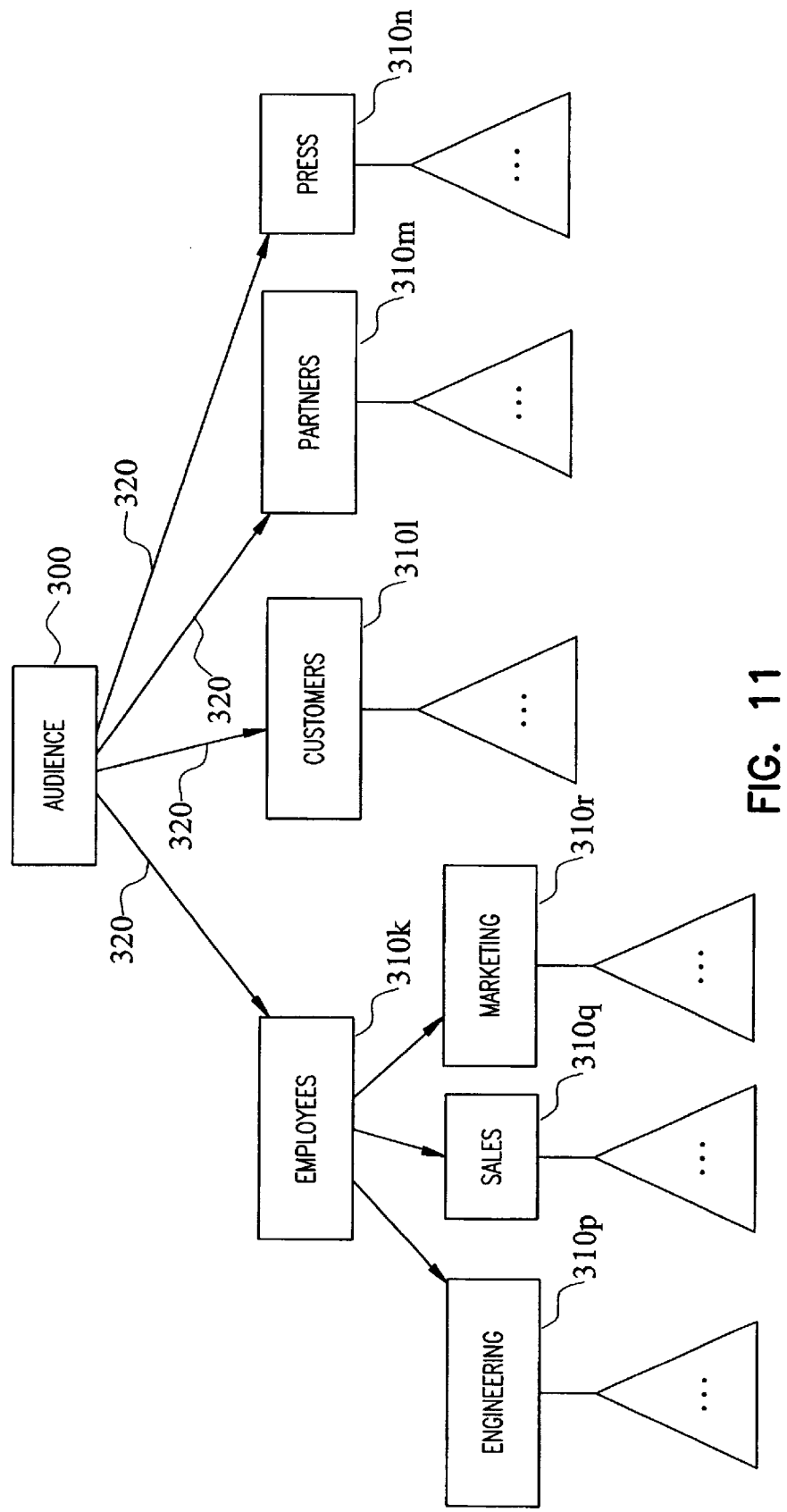
FIG. 11 shows an audience taxonomy.

The next portion of this description will address the mechanism for retrieving an appropriate answer from a corporate knowledge base of populated taxonomies in response to a query from a customer or from a knowledge worker (K-Worker). In the present system, two retrieval techniques may be utilized: Multiple-taxonomy browsing and query-based retrieval. In multiple-taxonomy browsing, the user or application screen may specify a taxonomic restriction or filter to limit the knowledge containers that are presented to the user. The taxonomic restriction in turn, specifies a set of concept nodes using boolean expressions and taxonomic relationships among the selected nodes. In the end, only knowledge containers tagged to a set of nodes that satisfy the relationships are presented to the user. In the present system, taxonomic relations include (but are not limited to) at, near, and under, where "at" designates the selected node, "near" designates nodes within some taxonomic distance of the selected node, and "under" designates descendants of the selected node. Boolean relations include (but are not limited to) and, or, and not. Also, it is important to note that any taxonomy (including topic, filter, and lexical taxonomies) may be used in filtering Consider the Document Sources Taxonomy of FIG. 10 and the Audience Taxonomy of FIG. 11. As shown in FIGS. 10 and 11, the taxonomies 30a and 30b, respectively, are comprised of a root node (300a–b), a plurality of concept nodes 310(a–r) and a plurality of edges 320. Using the taxonomy shown in FIG. 10, knowledge containers presented to the user may be restricted to those that are either research reports 310f or are from the Wall Street Journal 310h. Referring to the taxonomy shown in FIG. 11, knowledge containers presented to the user may be restricted to those whose intended audience is marking employees 310r. The restriction may be realized with the expression:

(Document-sources:External-sources:News sources:WSJ or
under(Document-sources:External-sources:Research-reports)) and
under(Audience:Employees:Marketing)

A knowledge container will not be returned to the user unless it is tagged to either the WSJ node 310h or to some node that is a descendant of the Research-reports node 310f (nodes are considered to be their own descendants) in FIG. 10 (Document Sources Taxonomy), and it is tagged to a descendant of the Marketing node 310r in FIG. 11 (the Audience Taxonomy). An advantage of filtering by multiple taxonomies is that orthogonal characteristics of the knowledge container collection may be specified independently and the intersection (or union, or a more complex relationship) of the specified characteristics in the knowledge container set may be easily found. That the retrieval technique supports subsequent modification of the filter so that the user, with a minimum of effort, may refine his information request.

In query-based retrieval, the user (or application screen) specifies: a query; zero or more initial taxonomy tags; zero or more taxonomic restrictions; and knowledge container restrictions (if any). In operation, the user (or the application screen) first specifies a query, in natural language. The user then may identify initial taxonomy tags. That is, the user selects concept nodes that will further define the query. These concept nodes are used in retrieval along with the nodes found by autocontextualization of the query. The user may then specify a filter, which is to be applied to the results of retrieval. Next, one or more interest taxonomy tags are specified. Interest taxonomy tags affect the order of presentation of results to the user. Interest taxonomy tags may be specified by the user in the retrieval interface, added by an application screen, or be drawn from the user's customer profile. In the latter case, interest taxonomy tags support personalization; it may be appreciated that an individual's interest profile affects the presentation of results of all of the user's information requests. From an implementation perspective, interest taxonomy tags affect ranking or ordering of knowledge containers but do not affect knowledge container selection. The user may next decide to restrict the knowledge containers returned by the system to those of a given set of knowledge container types.

The user's inputs are then passed to the query-based retrieval system for resolution. Query-based Retrieval includes five stages: preparation; autocontextualization of query; region designation; search; and ranking. The preparation step takes place before any queries are run. In the described embodiment, preparation includes constructing a set of indexes (for use in the search step). Next, the system performs an autocontextualization of the query, as was described previously in this description. Region designation may then be performed to identify areas of the taxonomy that are likely to correspond to what the query is about. Next, a search is performed by a search engine. The searches are restricted to knowledge containers tagged to nodes in at least one of the areas identified in the previous stage. The result of this stage is one or more independently ordered lists of knowledge containers. The system then ranks the results by combining the ordered lists into a single list. The final result of executing these five stages is a single ordered list of knowledge containers.

Before a more specific discussion of query-based retrieval can be made, it is necessary to briefly discuss several basic terms. A search engine is a program that searches a document collection and returns documents in response to a query. The documents are typically ordered by their rank (closeness of their match to the query). A search engine typically operates on an index built from the document collection, rather than directly on the documents themselves; this is well known in the art. A document is said to be in an index if the document is indexed by that index. The index is available at the point when a query is entered, thus the index is built in a preparation stage, prior to any user interaction with the system.

A full-text retrieval engine is one kind of search engine that searches the entire content of documents in the collection. There are a number of other search options, including searching over sets of keywords that have been manually associated with each document, searching the abstracts of the documents or the titles but not the text. The term content-based retrieval is used to refer to any of these kinds of searches, and content-based retrieval engine refers to a program that performs such a search, in contrast for example to a meta-data search. Meta-data is information about the document rather than its content. Typical meta-data elements are author and creation date. A library catalog that offers subject, author, and titles search provides a meta-data search (it can be seen that the line between meta-data and content is blurry, as title can be considered both). Identifying a set of documents that are considered by the search engine to be responses to the query is distinguished from ranking, which is ordering the documents in that set according to a measure of how well the document satisfies the query. The ranking performed by full-text retrieval engines is based on vocabulary usage. That is, words occurring in a query that appear with the same frequency in every document contribute nothing to the rank of any document. At the other end of the spectrum, a query word that appears in only one document, and occurs many times in that document, greatly increases the rank of that document. Ranking takes into account the occurrences of a word both in the document being ranked and in the collection at large—to be precise, in the indexed collection. To be more precise, it is the occurrences of terms or sequences of words that a search engine takes into account. The mathematical expression commonly associated with ranking is:

$$\text{Document Rank} = Tf/df$$

where, $Tf$ = number of times a term occurs in a document
$df$ = document frequency (number of documents that the term occurs in)

It may be appreciated that the tf/df value for a term in a document depends not merely on that document but also on its frequency of occurrence in other documents in the collection. An index of a document collection stores term frequency statistics for the documents in the collection. Therefore, if a document is added to, or subtracted from the collection of documents over which an index is generated, the ranking of results for a query using that index may also be changed.

Now that the stages have been generally discussed and the fundamentals of information retrieval introduced, it is now possible to describe specific details of a preferred embodiment of the query-based retrieval system. In the preparation stage, one embodiment of the present invention uses a single index to index the knowledge containers in the knowledge database. However, in the preferred embodiment, the retrieval system uses multiple indexes that taken together index all the knowledge containers in the knowledge base. Multiple indexes are preferable because they allow the system to take advantage of variation in vocabulary usage within the taxonomy. As explained above, if the set of knowledge containers over which an index is generated is changed, the ranking of results for a query using that index is also changed. Generally, if an index includes only knowledge containers from a subdomain in which a query term is used in a distinctive manner, better results can be obtained using that index than using an index which covers not only those knowledge containers in the subdomain but also covers many other knowledge containers. The Tf/df values for the query term in knowledge containers in the subdomain will be different than the Tf/df values for the term in knowledge containers in the collection as a whole. An index over a subdomain will better reflect the vocabulary usage in the subdomain than an index over the entire collection, so ranking of knowledge containers retrieved from an index over the subdomain will reflect the quality of the responses more accurately. Because the rank of a knowledge container found in an index depends both on that knowledge container and on the other knowledge containers in the index, better results may be obtained for retrieval by searching a number of small indexes, each of which covers a coherent subset of the knowledge containers, than by searching one large index. In the single index embodiment an index is built for the entire document set, and the search engine searches over that index. In one multi-index embodiment, an index is built for each node of the taxonomies. At query time, once region designation is complete, the search engine aggregates the indexes of nodes in an identified region to produce a single index for that region. The search engine then searches over that aggregate index. In the preferred multi-index embodiment, a set of knowledge containers that have similar vocabulary usage is treated as an approximation to a subdomain that has distinctive vocabulary usage. In this embodiment, nodes are clustered according to the vocabulary usage of the knowledge containers tagged to them, using any one of several text clustering algorithms known in the art, an example of which is "nearest neighbor" clustering. Thereby, subsets of nodes with similar vocabulary usage are discovered. A grouping of knowledge containers that takes advantage of the human knowledge that went into associating knowledge containers with concept nodes is desirable; the grouping preferably maintains the taxonomic structure put on the knowledge container set by the knowledge-building effort. To this end, all of the knowledge containers tagged to a particular concept node can be thought of as being aggregated together into one "concept-node-document". It is these "concept-node-documents" that are inputs to the clustering algorithm. The output of the clustering algorithm is clusters of nodes, each cluster comprised of a collection of knowledge containers that use similar vocabulary. Also, an index is built covering the knowledge containers tagged to nodes in the cluster. As a result, all knowledge containers tagged to a particular node are in the same index. A mapping from nodes to indexes is maintained for use at retrieval time. An index covers a concept node if the knowledge containers tagged to the node are in the index. At a minimum, every concept node is in some index, and some nodes may be in more than one index. In fact, there may be a benefit in having partial redundancy (generally similar indexes but of varying sizes), in that a better fit of indexes to a region can be obtained. This may be accomplished by running the clustering algorithm several times, and varying a parameter that specifies the number of clusters to produce.

Figure 12:
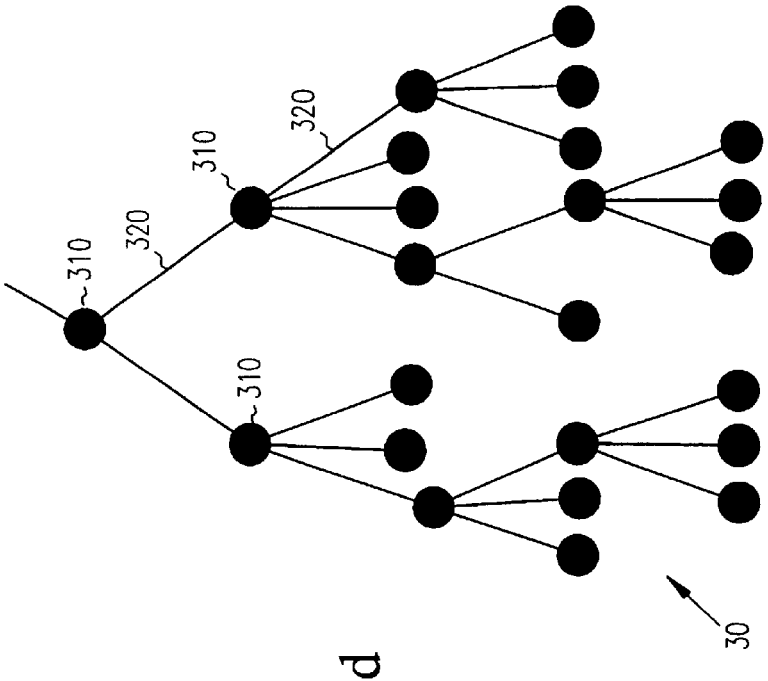
FIG. 12 shows knowledge containers tagged to a particular node, which are concatenated into a single "concept-node-document"
Figure 13:
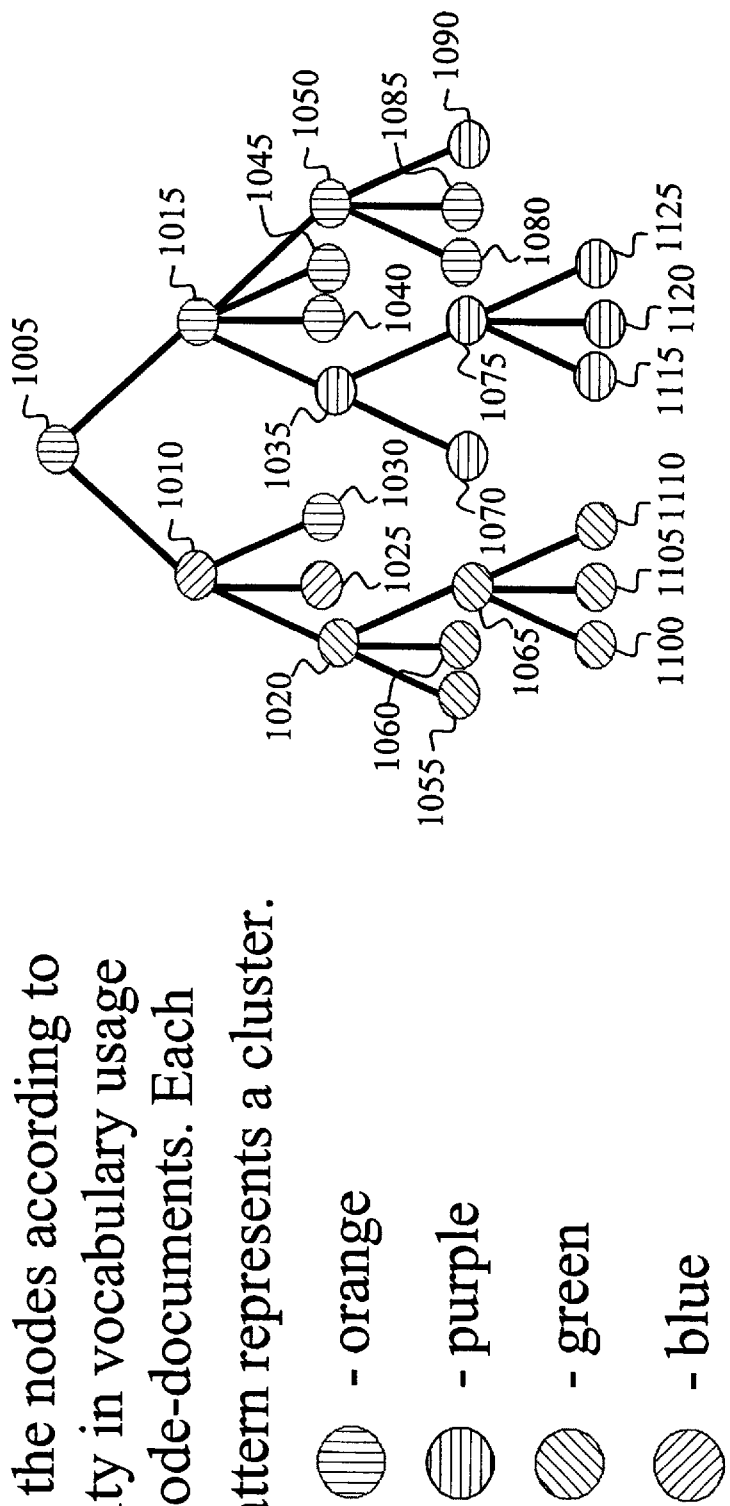
FIG. 13 shows an example of a clustering algorithm being run over the "concept-node-documents"
Figure 14:
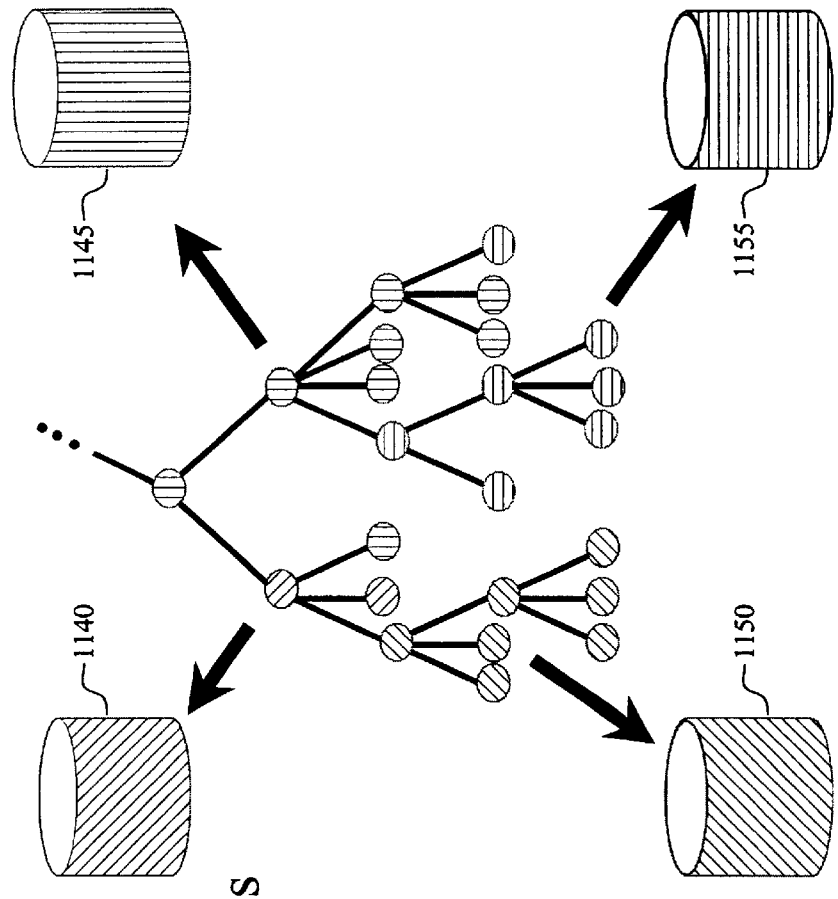
FIG. 14 shows how an index is constructed of the knowledge containers tagged to the nodes in the cluster.

An example of a taxonomy according to this implementation is shown in FIG. 12. As shown in FIG. 12, taxonomy 30 comprises a plurality of nodes 310 and edges 320. Each node in FIG. 12 is a concatenation of all documents tagged to that node. The clustering algorithm is then run over these concept-node-documents. The information returned by concept-node-document clustering can be viewed as identifying clusters of nodes. As shown in FIG. 13, taxonomy 1000 comprises nodes 1005–1125. Nodes 1005, 1015, 1030, 1040, 1045, 1050, 1080 and 1085 belong to the orange cluster; nodes 1010 and 1025 belong to the blue cluster; nodes 1020, 1055, 1060, 1065, 1100, 1105 and 1110 belong to the green cluster; and nodes 1035, 1070, 1075, 1090, 1115, 1120 and 1125 belong to the purple cluster. As further shown in FIG. 13, clusters may not necessarily be related (ancestors/descendants) to each other. Referring now to FIG. 14, it is seen that for each cluster, an index 1110–1140 is constructed of the knowledge containers tagged to the nodes in the cluster. The nodes comprising the blue cluster (FIG. 13) are placed in index 1140. The nodes comprising the orange cluster (FIG. 13) are placed in index 1145. The nodes comprising the purple cluster (FIG. 13) are placed in index 1150, and the nodes comprising the green cluster (FIG. 13) are placed in index 1155. If a knowledge container is tagged to multiple nodes in a cluster, the knowledge container appears once in the index for that cluster. If a knowledge container is tagged to nodes in different clusters, the knowledge container appears in the index for each cluster to which the knowledge container is tagged.

Once the preparation phase has completed, processing then flows to the second step of the process and autocontextualization of the query is performed. During this step, the text of the query may be augmented or expanded. This query expansion may be based upon a thesaurus, to include synonyms or other related terms in the text. The query undergoes at least some of the stages of autocontextualization as described above. At the very least, topic taxonomy tag identification (step 7) is performed. A number of taxonomy tags are requested from and returned by this step, and these combined with the initial taxonomy tags associated with the query are passed to the next stage of retrieval. This set of taxonomy tags is hereafter referred to as the query taxonomy tags.

Figure 15:
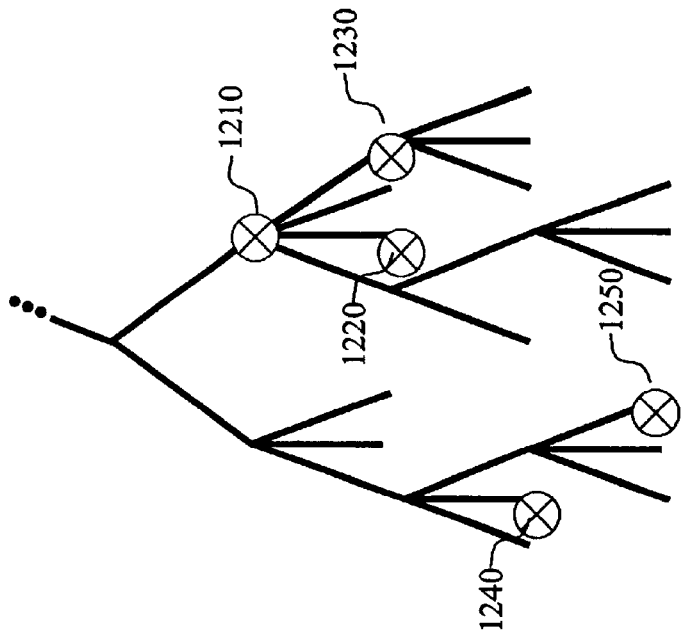
FIG. 15 shows the "marking" stage of regional designation.

The system now performs region designation to identify additional areas of the taxonomy to improve the results of the query. Region designation is necessary because in most cases, topic-taxonomy tag identification is implemented via a text classifier, which is inherently imperfect on unseen data. The set of knowledge containers that share taxonomy tags with the query may have relevant knowledge containers omitted, due to this inherent imperfection. The imperfection can be ameliorated by augmenting the query taxonomy tags, which results in augmenting the set of knowledge containers that are considered by the subsequent search stage. In one embodiment, the query taxonomy tags are augmented by including, for each node in the set, its parent and child nodes in the taxonomy. In another embodiment, the query taxonomy tags are augmented by including, for each node in the set, all of its descendants. In yet another embodiment, the query taxonomy tags are augmented in two ways. First, the query taxonomy tags are augmented by including knowledge containers that have similar vocabulary usage but were not tagged to the concept nodes identified by the query taxonomy tags, and second by also including knowledge containers that are tagged to nodes close in the taxonomy to the concept nodes identified by the query taxonomy tags. The rationale for this strategy is that concept nodes that are close together in the taxonomy are likely to be about similar topics. In addition to augmenting the knowledge container set, this step groups the concept nodes identified by the query taxonomy tags such that an identified region includes concept nodes whose knowledge containers are about a set of closely related concepts, and distinct regions denote concept nodes whose knowledge containers are about significantly different concepts. This allows the system to treat distinct regions in distinct ways (ranking knowledge containers from one region higher than knowledge containers from another, for example) as well as allowing for relationships between regions. In one embodiment, all regions are treated equally for region designation purposes. In another embodiment, a knowledge container tagged to one region is preferred over knowledge containers tagged to other regions. In yet another embodiment, all regions are treated conjunctively, in a further embodiment all regions are treated disjunctively; and in still another embodiment some regions are treated conjunctively and some regions are treated disjunctively. A conjunctive interpretation is one in which knowledge containers tagged to more regions are preferred to knowledge containers tagged to fewer regions; a disjunctive interpretation is one in which knowledge containers tagged to a single region are preferred to knowledge containers tagged to multiple regions. For example, a conjunctive interpretation is generally appropriate for a query about tax consequences of variable rate mortgages, where a knowledge container that is tagged to both a node about mortgages and to a node about taxes would be preferred over a knowledge container that is tagged to just one or the other. A disjunctive interpretation is generally appropriate for a lexically ambiguous query that is tagged to one concept node because of some query term, and is tagged to another concept node because of that same term used in a different sense, in which case it would be preferred to not have a particular knowledge container tagged to both nodes. The term "jaguar" occurring in a query, for example, may result in query taxonomy tags to concept nodes "Jungle Cat" and "Automobile", but the query is about one or the other, not both. The actual process of region designation has three steps: marking, smoothing, and aggregation. In the marking step, concept nodes are identified that are below some taxonomic distance threshold from query taxonomy tags that the concept nodes are likely to be about. The threshold and the number of query taxonomy tags they must be close to are parameters of the system that may be set based on experimentation. FIG. 15, further shows the operation of the marking step in accordance with the present invention. As shown in FIG. 15, distance is measured based on the edge distance in the taxonomy, where edges are treated as undirected and equal (unweighted). A setting of the parameters for which experimentation has been performed is a closeness of "one" (how close a node must be to query taxonomy tags) and number of query taxonomy tags being twenty per cent (i.e., how many query taxonomy tags to which a node must be close in order to be marked). Using these settings, assuming in one example that there are ten query taxonomy tags, a node with two or more immediate neighbors that are query taxonomy tags is marked. In FIG. 15, nodes 1210, 1220, 1230, 1240 and 1250 are marked nodes.

Figure 16:
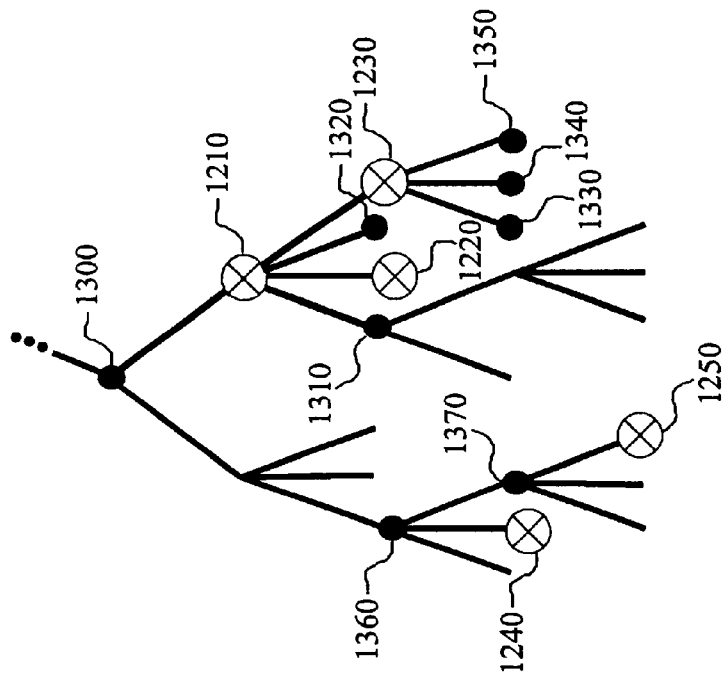
FIG. 16 shows an example of "smoothing"

After the marking step, smoothing may then performed. Smoothing identifies nodes that are immediate or near neighbors of marked and query taxonomy tags and includes these identified nodes in the augmented set of query taxonomy tags. Referring now to FIG. 16, it is shown that nodes 1300–1370 are sufficiently close to marked nodes 1210–1250 to qualify as smoothed nodes.

Figure 17:
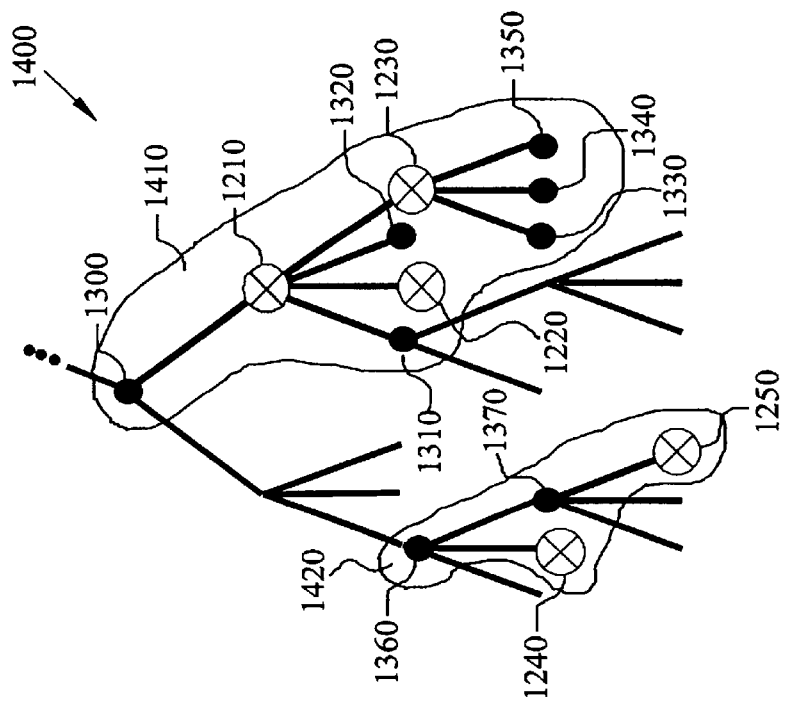
FIG. 17 shows an example of aggregation.

The aggregation step then defines subsets of the set of marked, smoothed (if smoothing is performed) and query taxonomy tags. If two nodes in the set of smoothed, marked, and query taxonomy tags are within some distance of each other (e.g., are immediate neighbors), then these nodes are defined to be in the same region. That is, a region is the transitive closure of this distance relation. The region definition is related to (maximal) connected components, but is defined on nodes rather than edges. Referring now to FIG. 17, it is shown that taxonomy 1400 comprises nodes 1210–1250 (as defined in FIG. 15), 1300–1370 (as defined in FIG. 16), and regions 1410 and 1420. Nodes 1210–1230 and 1300–1350 are in region 1410, and nodes 1240–1250 and 1360–1370 are in region 1420.

Figure 18:
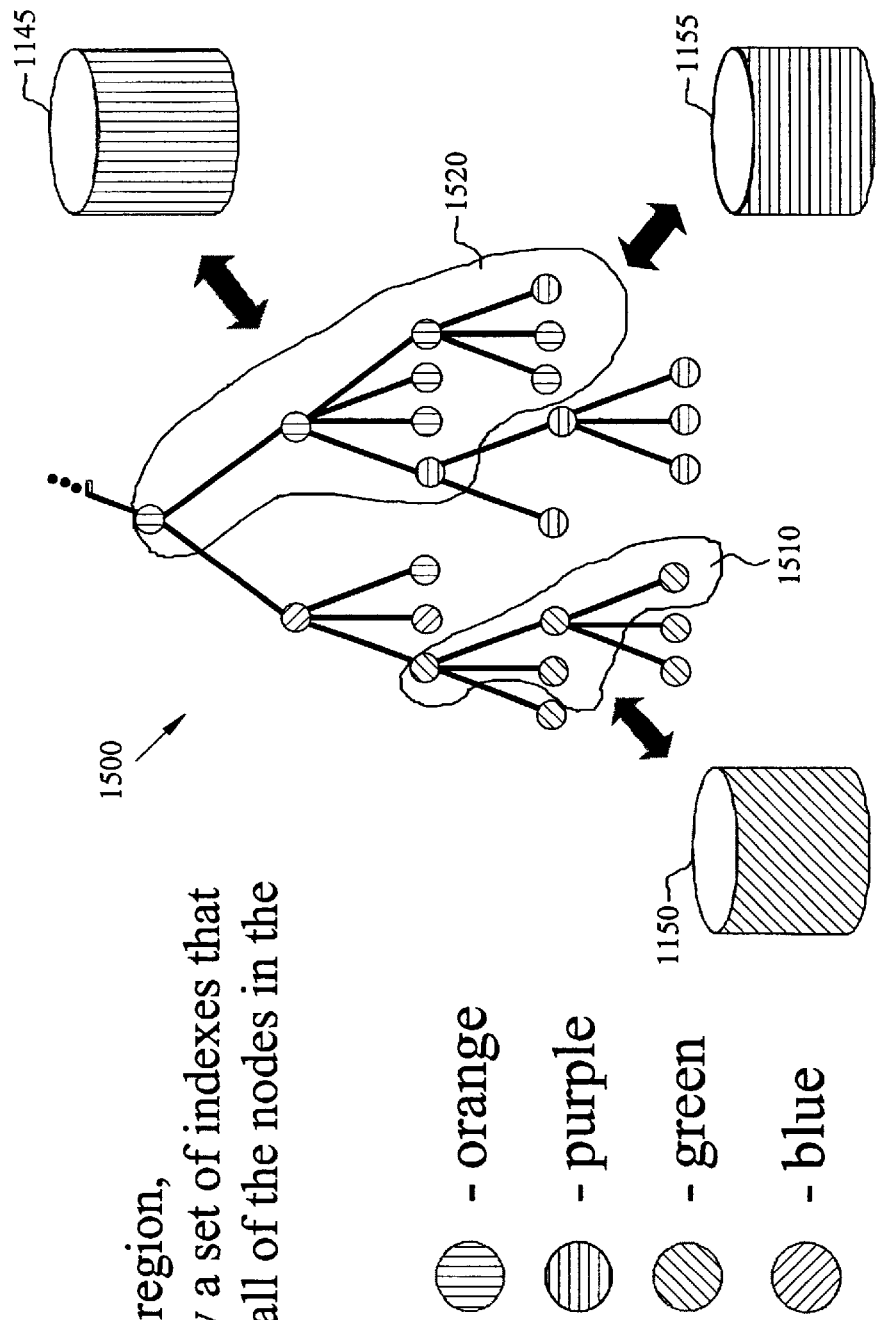
FIG. 18 shows a covering set of indexes found from mapping of nodes to indexes.

A search is then performed by invoking a content-based search engine one or more times, each time specifying a query and some set of indexes. Conceptually, the search engine is applied separately for each region. Regions are formed dynamically, and the objects on which search engines function are statically built indexes. Therefore, calling the search engine on a region is realized in approximation: for each region, a covering set of indexes is found from the mapping of nodes to indexes. More specifically, as shown in FIG. 18, taxonomy 1500 comprises regions 1510 and 1520. Region 1510 is comprised entirely of the green cluster (FIG. 14) so the search on this region would be limited to index 1150. Region 1520, on the other hand, comprises the orange cluster (FIG. 14) and the purple cluster (FIG. 14). Therefore, a search on this region would have to include indexes 1145 and 1155.

In addition to a search over each region, in one embodiment, a search is also performed over an index that covers the full knowledge container set. This search may be thought of as a "baseline search" over the "baseline index", as the results of region searches are evaluated against the results of the baseline search. By this comparison, it can be determined if there is a knowledge container that happens to not be in any of the smaller indexes searched, but which has a very good content match to the query. The result of this step is a ranked list of knowledge containers.

Figure 19:
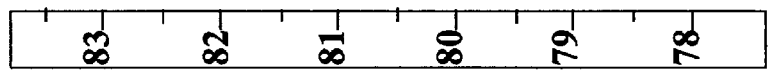
FIG. 19 shows the knowledge containers ordered by their adjusted ranks.

After searching over the indexes, ranking is employed to merge knowledge container lists returned by the search stage to produce a single list ordered by relevance. In very general terms, ranking is performed as follows: for each knowledge container, the rank returned by the search engine is adjusted by one or more values derived from some source of knowledge about the quality of that knowledge container as a response to the query. Referring now to FIG. 19, it is seen that knowledge containers 20 are ordered by their adjusted ranks (shown in FIG. 19 by distance from the bottom of the picture) into a single list. Any of these values may be scaled in any way. The resulting rank of knowledge container 20 represents the knowledge container's relevance to the query. Knowledge sources may include the quality of the region(s) a knowledge container is tagged to (the quality of a taxonomy tag may be a finction of its weight such that the quality of a region may be a function of the quality of the query taxonomy tags in the region), the quality of the knowledge container's taxonomy tags, the taxonomic distance from the knowledge container's taxonomy tags to the query taxonomy tags, the number of regions into which a knowledge container is tagged, the proportion of a knowledge container's taxonomy tags that are within designated regions, and the level of previous user satisfaction with the knowledge container (based upon implicit or explicit user feedback from previous queries).

The rank returned by the search engine for a knowledge container may be adjusted by a value that represents the quality of the region the knowledge container is tagged to, and is further adjusted by a value that combines the quality of the knowledge container's taxonomy tags and the distance from the knowledge container's taxonomy tags to the query taxonomy tags. The taxonomic distance between two regions of tags may be defined as a function of the taxonomic distance between tags in the first region and tags in the second region. The baseline index is treated as a region, and may be given a quality value, which may be a constant, for the purposes of ranking. Subsequent to ranking the knowledge containers by relevance to the query, the rank of each knowledge container may be further adjusted by its relevance to the user's interests. The taxonomic distance from the knowledge container's taxonomy tags to the user's interest taxonomy tags is a measure of a knowledge container's relevance to the user's interests. Upon completion of the ranking step, a ranked list of knowledge containers is presented to the user. This completes an instance of retrieving an appropriate answer from a corporate knowledge base of populated taxonomies in response to a query.

Thus far, this specification has described the algorithm for retrieving appropriate knowledge containers as a single query-response sequence. In other words, users type a question, perhaps augmented by initial taxonomy tags, interest taxonomy tags, and/or taxonomic restrictions (filters), and a single list of knowledge containers is returned. Another aspect of the invention is the ability to use the taxonomies and the retrieval algorithm to create a multi-step interactive "dialog" with users that leads them to appropriate knowledge containers.

A multi-step dialog begins with the user of the system entering, via either boxes where they can type text, or selection lists of possible choices, a combination of:
- a) query text (possibly added to the query text from the previous step),
- b) desired administrative meta-data values; e.g. desired date ranges for creation-date of knowledge containers to be retrieved,
- c) taxonomy tags and weights (perhaps segmented for ease of entry; e.g. "Very relevant", "Somewhat relevant", "Not relevant") to be associated with the question;
- d) taxonomic restrictions, used as described above (with respect to retrieval techniques) to limit the areas of taxonomies from which response knowledge containers are drawn.

Note that in a preferred embodiment, the user is presented with an area for entering query text, or the user may be simply asked to choose among various taxonomies, taxonomy regions, and nodes. Based on the inputs above, the system responds to the question (the combination of 1(a)–(d)) with at least one of the following:
- a) a list of result knowledge containers that are possible "answers" to the question, each with a relevance score between 0 and 1;
- b) a structured list of taxonomies, taxonomy regions, and/or taxonomy tags that the system believes may be associated with the question, and the weight of the association. This list may be augmented with annotations that indicate concept nodes, regions, or taxonomies that are likely to be mutually exclusive, e.g. because their knowledge containers use different vocabulary; and
- c) a list of terminology which may be useful in augmenting the query text. This list can be created using the words and phrases that are most strongly associated by the statistical text classifier with the taxonomy tags assigned to the query during the autocontextualization process.

The application display may use items 2(a),(b), and (c) to create a new entry screen for the user that essentially represents the system's response in this step of the dialog and allows the user to enter their next query in the conversation via various entry areas on an application screen. As implied by 2(a),(b), and (c), this response application display can include one or more of:
  (1) Knowledge container results: a list of zero or more knowledge containers that the system considers possible "answers" or highly relevant information to the user's question. These can be presented as clickable links with meta-data indicating the knowledge container's title, synopsis, dates, author, etc., where clicking will lead the user to a screen presenting the full content of the knowledge container; alternatively, if the system has one or more knowledge containers that it believes with high confidence will serve as answers to the user's question, it can simply display the full content of those knowledge containers directly.

Figure 20:
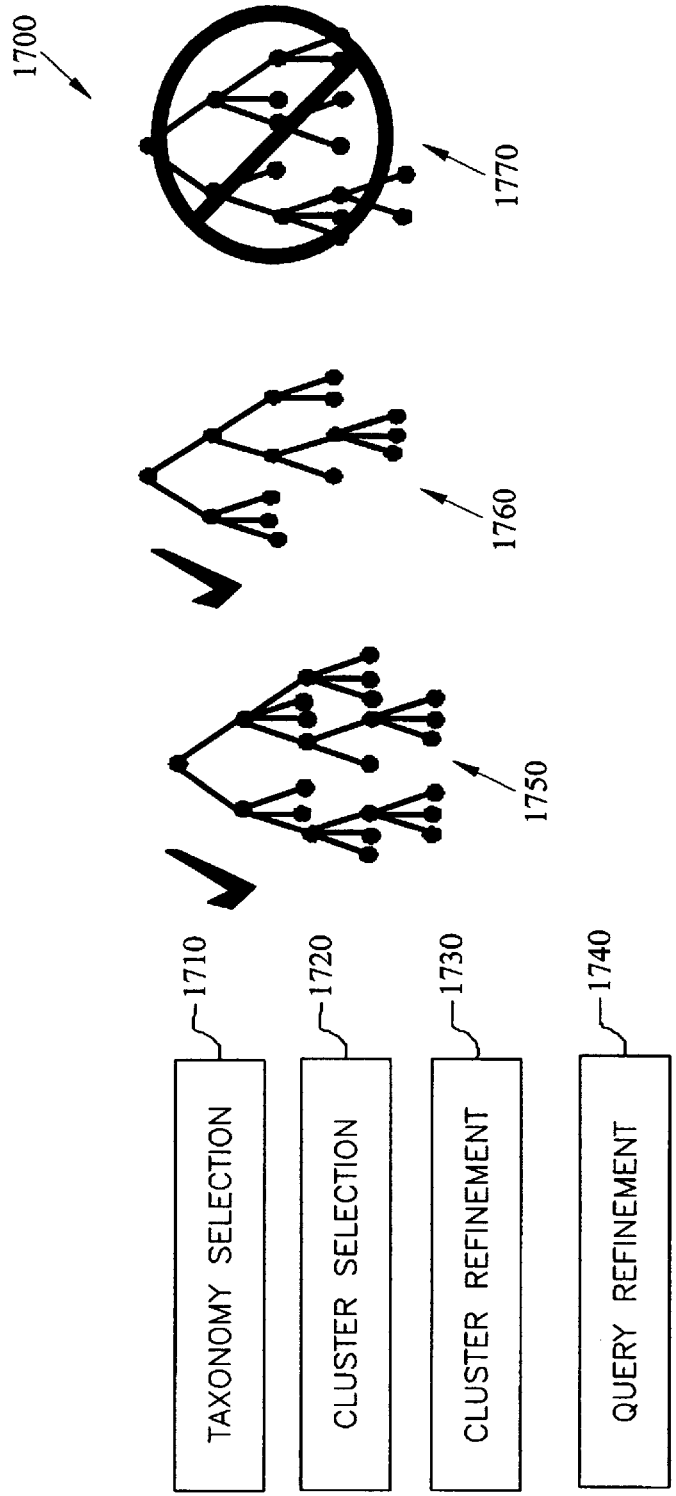
FIG. 20 shows a step in the interactive dialogue where the user can choose among the taxonomies.
Figure 21:
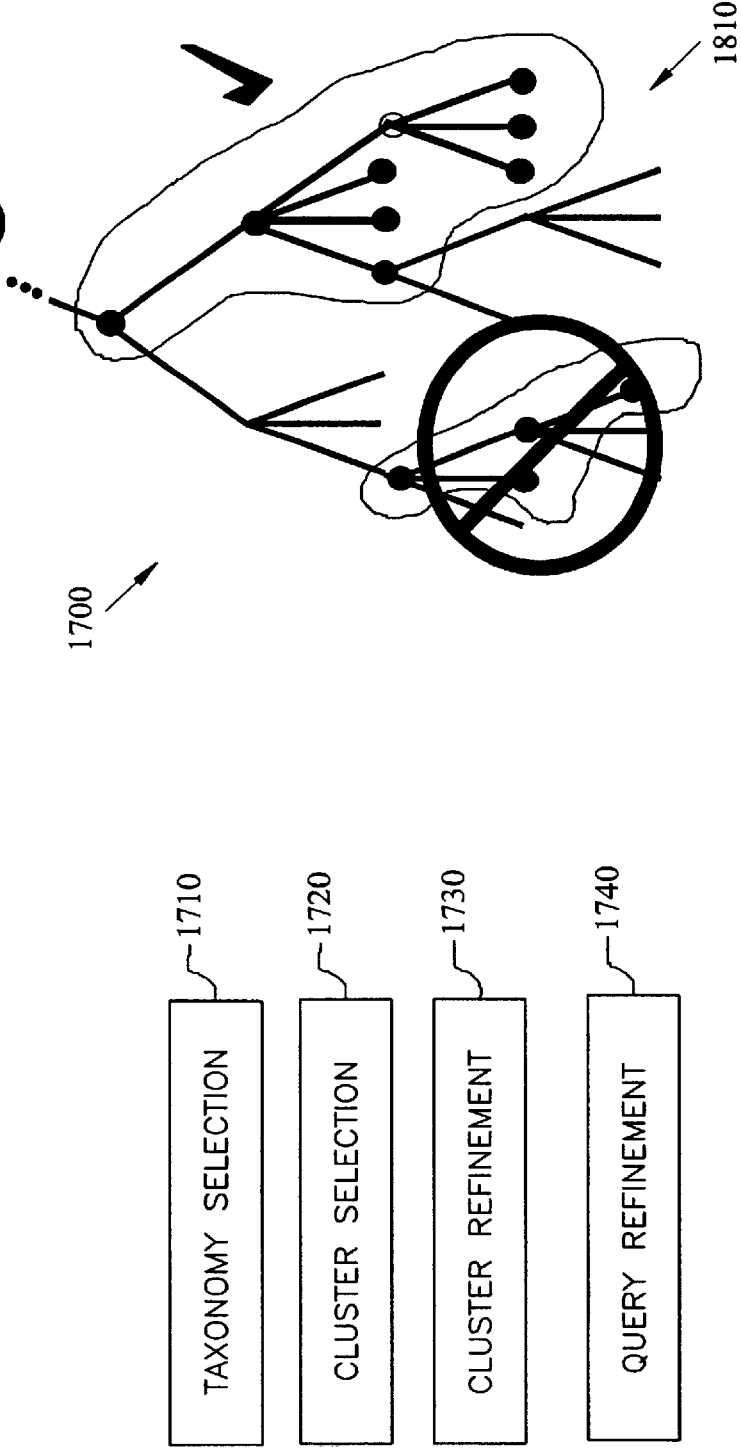
FIG. 21 shows a step in the interactive dialogue where the user can choose among the clusters.
Figure 24:

(2) Clarifying Questions: A list of zero or more "Clarifying Questions" based on items 2(b) and 2(c) listed above. These clarifying questions are constructed based on 2(b) and 2(c) in a variety of ways:
  a) Taxonomy Selection: Users may be asked to indicate which of the returned taxonomies are relevant or irrelevant to the question at hand. For example, referring to FIG. 20, there is shown a typical user interface 1700 comprised of four "buttons" 1710–1740. When the user presses the Taxonomy Selection button (1710), the user is presented with taxonomies 1750–1770. The system may then ask the user if Geographic considerations (as an example) are an important aspect of the user's question, based on tagging the question via autocontextualization to a Geography taxonomy. The user's response to this type of question are added to the Taxonomic Restrictions of the user's question, resulting in the system discarding taxonomy 1770, which leads to a more precise response in the next round of the dialog.
  b) Region Selection: As shown in FIG. 21, users may similarly be asked to indicate which knowledge map regions are relevant. More specifically, interface 1700 again presents the user with buttons 1710–1740. When the user presses the Cluster Selection button (1720), the user is presented with taxonomy 1810. This can take the form of a list of regions for users to choose from; or alternatively, using cues in the taxonomy structure such as two distant regions from the same taxonomy, the system may present two or more regions as mutually exclusive alternatives. For example, suppose a user asks a question about Jaguars. Autocontextualization may produce tags related to both automobiles and animals, and these may be expanded by the retrieval process into different regions. The system may determine based on the taxonomic structure that these are likely to be mutually exclusive regions. Thus the user may be presented with the question "Is your question more relevant to automobiles or to animals?" Just as for taxonomy selection, the user's responses to this type of question are added to the taxonomic restrictions of the user's question, resulting in a more precise response in the next round of the dialog.
  c) Region Adjustment: In addition to allowing users to select among regions, the system may allow users to adjust regions. This can involve either adding or removing concept-nodes to/from a region that has been identified for the question. For example, suppose the system believes a user's question is about sports and during one step of the dialog returns a taxonomic region containing a general "Sports" concept-node and a variety of descendent concept-nodes for different types of sports. The user may be able to indicate that their question is about only "Team Sports", not "Individual Sports", thus eliminating part of the region from consideration. Similarly, they may eliminate an individual sport like "Hockey"(or select only "Hockey"). To allow this type of manipulation of regions, the application screen may display not only the elements of regions but, for example, their taxonomic parent and child nodes, so that users can expand the region to be more general (by adding parents) or more specific (by adding children). Just as for taxonomy selection, the user's responses to this type of question are added to the taxonomic restrictions of the user's question, resulting in a more precise response in the next round of the dialog.

d) Concept-Node Selection: Similar to region selection and adjustment, the application screen can allow users to select concept-nodes to add, remove, emphasize, or de-emphasize. The screen can display, for example, the concept-nodes returned by the system, along with possibly parent and child nodes, for selection. The user may choose to eliminate or add nodes from consideration. These can either be cast as restrictions—e.g. "My question has nothing to do with this concept", requirements "My question is specifically about this concept (or its subconcepts)", or preferences—"Emphasize or de-emphasize this concept". Restrictions and requirements are added to the taxonomic restrictions of the user's question for the next round of the dialog; preferences are added to the taxonomy tags passed in with the user's question for the next round of the dialog.

e) Parameterized Questions (PQs): The system may have additional information about specific types of clarifying questions that are useful in the domain. A PQ consists of a predefined question text for display, with placeholders for names or descriptions of concept-nodes that are determined to apply to the user's question at dialog time. For example, suppose the user is in a domain with a taxonomy of Companies and a taxonomy of Corporate Events, such as Earnings announcements, Litigations, IPO's, Management Changes, etc. Because a common user question involves asking about types of events at specific companies, the system might contain a PQ of the form:

"Show me [?Event] happening for [?Company]".

Associated with this text is a taxonomic-restriction expression, with variables in the place of concept nodes. When displayed within a dialog with a user, the ?Event would be replaced with a list of concept-node names or descriptions from the event taxonomy; similarly ?Company would be replaced with a list of concept-nodes from the company taxonomy. If previous dialog steps had determined that a particular event and/or a particular company were associated with the user's questions, the ?Event and ?Company lists might have these values pre-selected. This allows the user to either verify these values by selecting the PQ, or to substitute alternative values. Once the user has made selections, the boolean taxonomy-restriction expression is instantiated by replacing its variables with the corresponding user selections, and the resulting taxonomic restriction is added to the user's query for the subsequent step of the dialog.

The PQ mechanism can be especially useful in situations where users type only very short query texts. For example, suppose a user in the Event/Company domain types as a query simply "IBM". The system would return the concept-node "IBM" from the company taxonomy as part of its response to the question. The part of the system that produces the application screen for the next step in the dialog might find the PQ listed above and display it as part of the response to the user, with "IBM" pre-selected as the company but nothing pre-selected as the Event. In effect, it tells the user that the system "knows" about a certain range of events at companies, and lets the user easily indicate whether they are interested specifically in one of those events.

f) Terminology Selection: The system may use the autocontextualization process to select a list of "related terminology" and present the list to the user, who may select one or more of the terms listed to be added to the question text.

All of these clarifying dialog techniques make significant and direct use of the multi-taxonomy structure that knowledge containers have been tagged into. The novel aspect exists in the combination of using a multi-taxonomy structure to tag knowledge containers via autocontextualization; to retrieve knowledge containers using the retrieval methods described above; and to drive an interactive dialog to help users find knowledge containers through multiple steps.

The combination of taxonomies, taxonomy tags, taxonomic restrictions (filters), and knowledge containers provide unequaled personalization capabilities to the present system. Certain of these taxonomies can be used to: capture the universe of information needs and interests of end-users; tag the knowledge containers representing these users with the appropriate concept nodes from these taxonomies, and use these concept nodes when retrieving information to personalize the delivery of knowledge containers to the user. Further, the system can use this tagging and other aspects of the knowledge containers in order to create a display format appropriate for the needs of the user receiving the knowledge container.

In order to personalize interactions with a specific customer, the system has a model for representing that customer and their interests and needs. As discussed above, that model is the knowledge container of type "Customer." The taxonomy tags associated with each customer knowledge container specify what the customer is interested in, and how interested he or she is. The system supports profiling a customer's interaction with the system explicitly based on stated or applied preferences, and implicitly based on what the system has learned from interacting with the customer.

Explicit profiling allows the user to select items of interest explicitly from one or more taxonomies. These, along with a default or explicit weight, become taxonomy tags for their customer knowledge container. Implicit profiling, on the other hand, relies on the system to add or modify customer knowledge container taxonomy tags in order to profile the customer. For example, when creating the customer knowledge container, the system may set a concept in "access level" or "entitlement level" taxonomies that match the privileges they wish to accord the end user whom the knowledge container represents. The system may alternatively observe user behavior and then modify taxonomy tags accordingly. That is, the system can increase the weight of taxonomy tags that are frequently spotted in the user's questions during the autocontextualization segment of the retrieval process and it can increase the weight of taxonomy tags for answers given by the user during the dialog segment of the retrieval process. Finally, the business context of the interaction, including the application screen, can create an implicit profiling which drives the retrieval. For example, a particular web page or email address from which or to which a question is entered into the system may implicitly add taxonomy tags to the user's question. This particular kind of implicit profiling is typically transient in that it only modifies the current interaction, but does not change the tagging of the user's customer knowledge container.

What is claimed is:

1. A knowledge map representation of selected discrete perspectives of a domain of knowledge, said knowledge map useable by a knowledge instance classification computer program to classify instances of knowledge according to said discrete perspectives, said representation comprising:
- a plurality of separate taxonomies, each separate taxonomy representing one of said discrete perspectives of the knowledge domain;
- wherein each taxonomy is organized as a graph of nodes, connected by edges, each node of said graph corresponding to a conceptual area within the discrete perspective that the taxonomy represents and each edge of said graph representing a parent-child relationship between the conceptual areas to which the nodes connected to that edge correspond.

2. The knowledge map of claim 1, wherein said graph is a directed acyclic graph.

3. The knowledge map of claim 1, wherein said graph is a hierarchical graph.

4. The knowledge map representation of claim 1, further comprising at least one knowledge instance associated with at least one node of said taxonomies;
- wherein the at least one association includes a classification of the knowledge instance within the knowledge domain.

5. The knowledge map representation of claim 1, wherein at least one of said taxonomies comprises a topic taxonomy, in which each node of the topic taxonomy represents one or more topics and an association of a knowledge instance with a node of said topic taxonomy indicates that at least some content of the knowledge instance is about the topic represented by that node.

6. The knowledge map representation of claim 1, wherein at least one of said taxonomies comprises a process taxonomy, in which each node of the process taxonomy represents a step in one or more business processes, and an association of a knowledge instance with a node of said process taxonomy indicates that at least some content of the knowledge instance is pertinent to the step represented by the node.

7. A knowledge map representation as in claim 6, wherein the at least one entity is a person, place, organization, product, family of products, or a customer segment.

8. The knowledge map representation of claim 1, wherein a taxonomic distance function between nodes is associated with at least one pair of nodes of a taxonomy and is a function of the graphical representation of the taxonomy.

9. The knowledge map representation of claim 8, wherein the at least one pair of nodes includes a parent node and a child node, and wherein the taxonomic distance function for the pair of nodes in the direction from the parent node to the child node is different than for the direction from the child node to the parent node.

10. The knowledge map representation of claim 8, wherein the taxonomic distance function for the at least one pair of nodes of a taxonomy at least partially depends on how deep in the taxonomy is the pair of nodes.

11. The knowledge map representation of claim 8, wherein the taxonomic distance function includes one or more parameters incorporated manually by a human user, wherein the taxonomic distance function accounts for human knowledge about a semantic distance between nodes in the taxonomy.

12. The knowledge map representation of claim 11, wherein the manually incorporated one or more parameters are represented in an editable table to facilitate computing the taxonomic distance function for a particular pair of nodes.

13. The knowledge map representation of claim 8, wherein the taxonomic distance function for a pair of nodes of a taxonomy at least partially depends on a type of that taxonomy.

14. The knowledge map representation of claim 1, wherein the knowledge map includes a plurality of knowledge map regions, wherein each knowledge map region comprises a group of one or more nodes collectively representing a coherent subdomain of knowledge.

15. The knowledge map representation of claim 14, wherein all nodes in a particular knowledge map region are in the same taxonomy.

16. The knowledge map representation of claim 15, wherein:
- taxonomic distance between nodes is a function of the graphical representation into which the taxonomy is organized;
- the knowledge map region is generally centered about a particular central node; and
- the nodes that are members of the region are those nodes having a lower taxonomic distance from the particular central node than nodes that are not members of the region associated with the particular central node.

17. The knowledge map representation of claim 15, wherein:
- one or more knowledge containers are associated with at least some of the nodes; and
- the nodes that are a member of the region have a similarity of vocabulary in the content of their associated knowledge containers.

18. The knowledge map representation of claim 15, wherein:
- the knowledge map region is generally centered about a particular central node;
- one or more knowledge containers are associated with at least some of the nodes; and
- the nodes that are members of the region are (1) those nodes having less taxonomic distance from the particular central node than nodes that are not members of the region, and also (2) for which there is similar vocabulary in the content of their. associated knowledge containers.

19. The knowledge map representation of claim 1, wherein at least one of said taxonomies comprises a filter taxonomy, in which each node of the filter taxonomy represents meta-data, which are characteristics of knowledge instances that cannot be readily derived from the content of the knowledge instance, and an association of a knowledge instance with a node of said filter taxonomy indicates that the knowledge instance includes the characteristic represented by that node.

20. The knowledge map representation of claim 1, wherein at least one of said taxonomies comprises a lexical taxonomy, in which each node of the lexical taxonomy represents a concept in the knowledge domain that is identifiable by one or more specific words or phrases, and an association of a knowledge instance with a node of said lexical taxonomy indicates that the knowledge instance includes one or more instances of the words or phrases indicative of the concept represented by that node.

21. The knowledge map representation of claim 1, wherein at least one of said taxonomies comprises an environment taxonomy, in which each node of the environment taxonomy represents at least one entity.

22. The knowledge map representation of claim 1, wherein at least one of said taxonomies comprises a diagnostic taxonomy, in which each node of the diagnostic taxonomy represents at least one symptom of a problem, and an association of a knowledge instance with a node of said diagnostic taxonomy indicates that at least some content of the knowledge instance describes a method to address that symptom.

23. The knowledge map representation of claim 1, wherein at least one of said taxonomies comprises a human characteristics taxonomy, in which each node of the human characteristics taxonomy represents one or more personal human attributes (e.g., address, height, weight, etc.), and an association of a knowledge instance with a node of the human characteristics taxonomy indicates that at least some content of the knowledge instance concerns at least one attribute represented by the node.

24. The knowledge map representation of claim 1, wherein at least one of said taxonomies comprises an entitlement taxonomy, in which each node of the entitlement taxonomy represents an access control level of permission for viewing content or accessing resources of knowledge instances, and an association of a knowledge instance with a node of said entitlement taxonomy indicates that the knowledge instance is to have the access control level specified by that node.

25. The knowledge map representation of claim 1, wherein at least one of said taxonomies comprises a standard taxonomy, in which each node of the standard taxonomy represents one or more topics, and an association of a knowledge instance with a node of the standard taxonomy indicates that at least some content of the knowledge container concerns the topic represented by the node.

26. The knowledge map representation of claim 1, wherein at least one of said taxonomies comprises an environment taxonomy, in which each node of the environment taxonomy represents at least one entity comprising a person.

27. The knowledge map representation of claim 1, wherein at least one of said taxonomies comprises an environment taxonomy, in which each node of the environment taxonomy represents at least one entity comprising a place.

28. The knowledge map representation of claim 1, wherein at least one of said taxonomies comprises an environment taxonomy, in which each node of the environment taxonomy represents at least one entity comprising an organization.

29. The knowledge map representation of claim 1, wherein at least one of said taxonomies comprises an environment taxonomy, in which each node of the environment taxonomy represents at least one entity comprising a product.

30. The knowledge map representation of claim 1, wherein at least one of said taxonomies comprises an environment taxonomy, in which each node of the environment taxonomy represents at least one entity comprising a family of products.

31. The knowledge map representation of claim 1, wherein at least one of said taxonomies comprises an environment taxonomy, in which each node of the environment taxonomy represents at least one entity comprising a customer segment.

32. A knowledge map comprising:
   a plurality of separate taxonomies, each separate taxonomy representing a discrete perspective of a knowledge domain; and
   wherein each taxonomy comprises nodes and edges connecting nodes, each node corresponding to a conceptual area within the discrete perspective that the taxonomy represents, and each edge representing a relationship between the conceptual areas to which the nodes connected to that edge correspond.

33. The knowledge map of claim 32, in which each separate taxonomy represents a discrete perspective that is orthogonal to the other discrete perspectives represented by the other separate taxonomies.

34. The knowledge map of claim 32, further comprising at least one association between a knowledge container and a node, and wherein the association classifies the knowledge container within the knowledge domain.

* * * * *